(12) United States Patent
Kan et al.

(10) Patent No.: US 9,146,640 B2
(45) Date of Patent: Sep. 29, 2015

(54) APPARATUS AND SYSTEM FOR CORRECTING TOUCH SIGNAL AND METHOD THEREOF

(71) Applicant: Wistron Corporation, New Taipei (TW)

(72) Inventors: Wei-Kuo Kan, New Taipei (TW); Yu-Yen Chen, New Taipei (TW); Shang-Chin Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 55 days.

(21) Appl. No.: 14/058,296

(22) Filed: Oct. 21, 2013

(65) Prior Publication Data

US 2015/0015541 A1 Jan. 15, 2015

(30) Foreign Application Priority Data

Jul. 12, 2013 (TW) .............................. 102125043 A

(51) Int. Cl.
G06F 3/041 (2006.01)
G06F 3/042 (2006.01)
(52) U.S. Cl.
CPC ............ *G06F 3/0418* (2013.01); *G06F 3/0421* (2013.01)
(58) Field of Classification Search
CPC . G06F 3/0418; G06F 3/0421; G06F 3/04109; G06F 3/042
USPC .................................................. 345/173–178
See application file for complete search history.

(56) References Cited

U.S. PATENT DOCUMENTS

| | | | |
|---|---|---|---|
| 2011/0090177 A1* | 4/2011 | Chuang et al. ................. | 345/175 |
| 2012/0075253 A1 | 3/2012 | Tsai et al. | |
| 2012/0268403 A1* | 10/2012 | Christiansson ............... | 345/173 |
| 2013/0241890 A1* | 9/2013 | Sharma ......................... | 345/175 |
| 2015/0002470 A1* | 1/2015 | Zhu et al. ...................... | 345/175 |

FOREIGN PATENT DOCUMENTS

TW 201214243 4/2012

OTHER PUBLICATIONS

"Office Action of Taiwan Counterpart Application", issued on May 15, 2015, with English translation thereof, p. 1-p. 14, in which the listed foreign reference was cited.

* cited by examiner

*Primary Examiner* — Kent Chang
*Assistant Examiner* — Nelson Rosario
(74) *Attorney, Agent, or Firm* — Jianq Chyun IP Office

(57) ABSTRACT

An apparatus and a system for correcting touch signal and a method thereof are provided. The method includes the following steps. A beam is emitted to obtain a detective beam by reflecting the beam with a reflective element, and a detective signal distribution graph is generated. A plurality of intersections, a covered region and a pixel position corresponding to the covered region are obtained according to the detective signal distribution graph and a threshold value distribution graph. A first area occupied by the covered region is calculated according to the detective signal distribution graph and the plurality of intersections. Whether an overexposure is occurred in the covered region is determined according to the first area corresponding to the covered region. If the overexposure is occurred in the covered region, the covered region being overexposed and the pixel position corresponding to the covered region being overexposed are corrected.

24 Claims, 29 Drawing Sheets

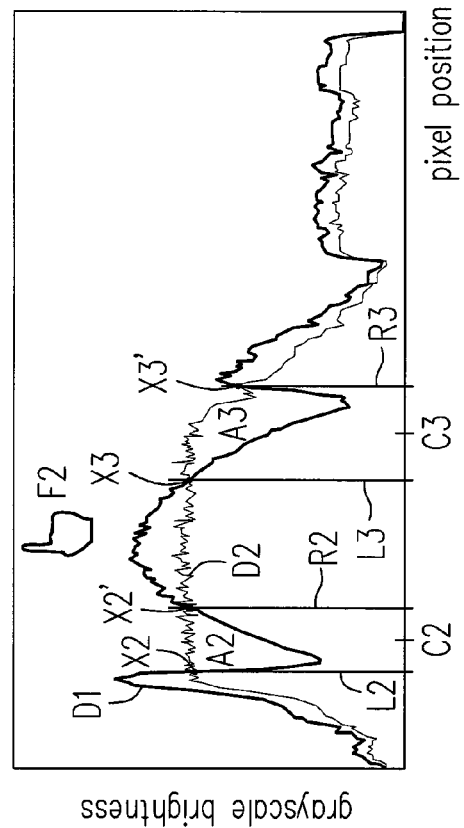
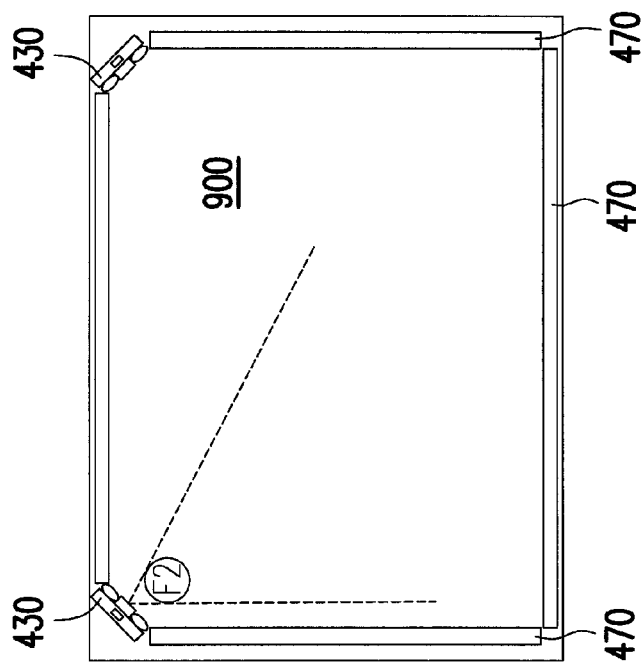
FIG. 7(b)
FIG. 7(a)

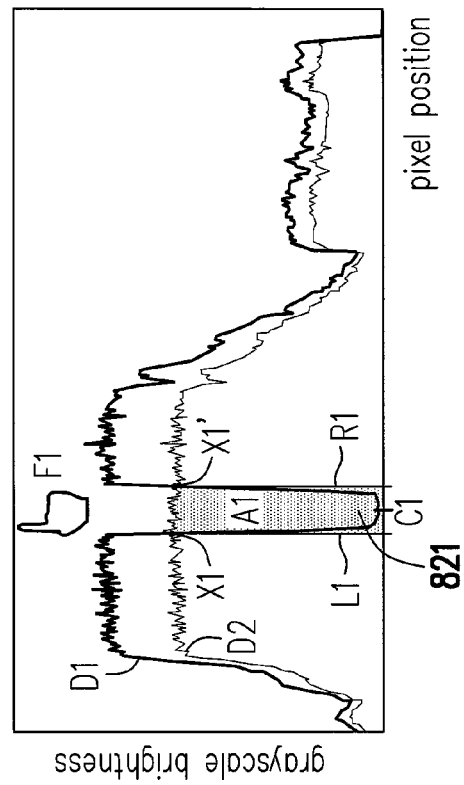
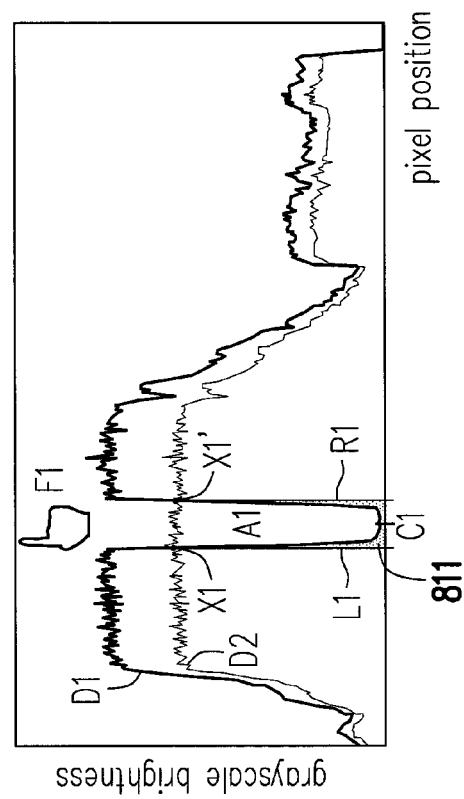

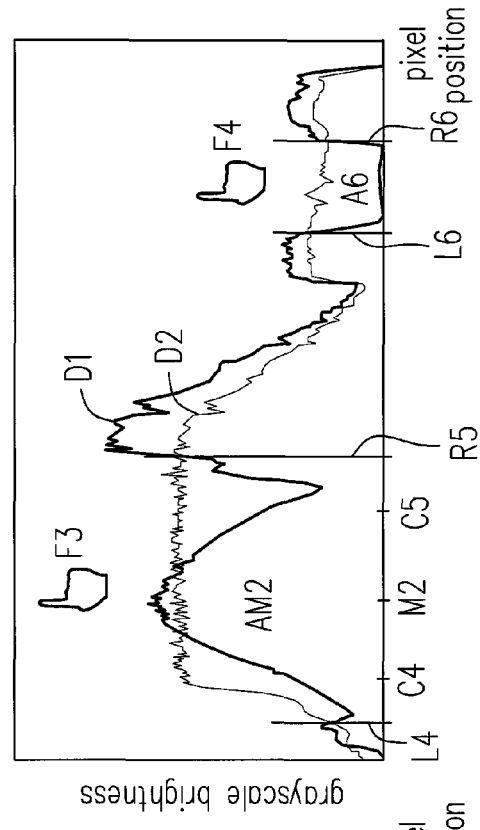
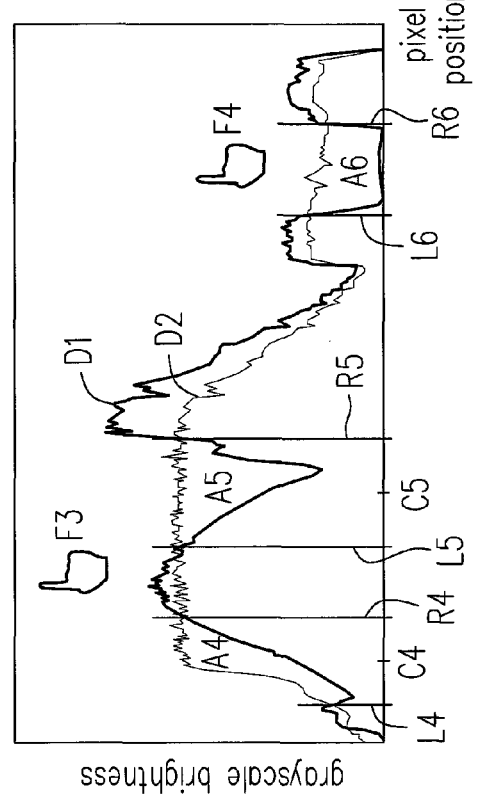
FIG. 14(a)
FIG. 14(b)

APPARATUS AND SYSTEM FOR CORRECTING TOUCH SIGNAL AND METHOD THEREOF

CROSS-REFERENCE TO RELATED APPLICATION

This application claims the priority benefit of Taiwan application serial no. 102125043, filed on Jul. 12, 2013. The entirety of the above-mentioned patent application is hereby incorporated by reference herein and made a part of this specification.

BACKGROUND OF THE INVENTION

1. Field of the Invention

The invention relates to a signal processing technology, and particularly to an apparatus and a system for correcting touch signal and a method thereof.

2. Description of Related Art

With rapid advancement of technology and improvement of processing technology, various smart electronic products such as electronic products with a touch screen have become one of the most common portable equipments nowadays. The touch screen can be generally categorized into a resistive type, a capacitive type and an optical type, and the optical type touch screen can be generally categorized into a reflective type and a shield type.

FIG. 1(a) is a schematic diagram of a shielded type optical touch screen. FIG. 1(b) is a schematic diagram of an ideal original signal received by a camera module at upper-left corner in FIG. 1(a). A x-axis in FIG. 1(b) represents a pixel position, and a y-axis represents a signal intensity (e.g., grayscale brightness).

FIG. 2(a) and FIG. 2(b) are schematic diagrams of a covered region generated by the shielded type optical touch screen. As shown in FIG. 2(a), when one single finger F1 of a user touches the screen, the original signal is covered so as to generate the covered region which is a region pointed by an arrow 210 in FIG. 2(b). Accordingly, a mathematical algorithm can be utilized to further detect the pixel position of the covered region, so that a position of a touch point can be calculated.

FIG. 3(a) and FIG. 3(b) are schematic diagrams of the covered region influenced by an overexposure and generated by the shielded type optical touch screen.

As shown in FIG. 3(a), when one single finger F2 of the user touches the screen on a region closed to the camera module, optical effects such as brightness being too strong or diffraction may occur, which results in enhancing the signal intensity originally in the covered region thereby generating two covered regions (refers to two regions respectively pointed by arrows 310 and 320 in FIG. 3(b)). The overexposure may influence a result of analyzing the position of the touch point, such that errors or misjudgments may occur when the optical touch screen analyzing a signal distribution of FIG. 3(b).

SUMMARY OF THE INVENTION

The invention is directed to an apparatus and a system for correcting touch signal and a method thereof, which are capable of determining whether a touch signal is influenced by an overexposure. Accordingly, the touch signal influenced by the overexposure can be corrected to reduce errors and misjudgments for the touch signal while improving accuracy in optical touch control.

The invention provides an apparatus for correcting touch signal, including a light emitting unit, a reflective element, a sensing unit and a control unit. The light emitting unit is configured to emit at least one beam. The reflective element is configured to reflect the at least one beam. The sensing unit is configured to obtain a detective beam generated by reflecting the at least one beam by at least one reflective element, thereby generating a detective signal distribution graph, in which the detective signal distribution graph indicates a plurality of pixel positions of an optical touching region and a plurality of corresponding signal intensities, and the at least one reflective element is disposed at periphery of the optical touching region. And, the control unit is coupled to the light emitting unit and the sensing unit. The control unit is configured for: obtaining a plurality of intersections, at least one covered region and the pixel positions corresponding to each of the at least one covered region according to the detective signal distribution graph and the threshold value distribution graph, in which each of the covered region corresponds to two adjacent intersections; calculating a first area occupied by each of the covered region according to the detective signal distribution graph and a plurality of intersections, in which the first area is surrounded by the detective signal distribution graph and the two adjacent intersections corresponding to the at least one covered region; determining whether an overexposure is occurred in the at least one covered region according to the first area corresponding to the covered region; and correcting the at least one covered region being overexposed and the pixel position corresponding to the covered region if the overexposure is occurred in the at least one covered region.

The invention provides a system for correcting touch signal, including an optical touch screen, a light emitting unit, a reflective element, a sensing unit and a control unit. The light emitting unit is configured to emit at least one beam; The reflective element is disposed at periphery of the optical touch screen, and configured to reflect the at least one beam; The sensing unit is configured to obtain a detective beam generated by reflecting the at least one beam by at least one reflective element, thereby generating a detective signal distribution graph, in which the detective signal distribution graph indicates a plurality of pixel positions of the optical touch screen and a plurality of corresponding signal intensities; and The control unit is coupled to the optical touch screen, the light emitting unit and the sensing unit, and configured for: obtaining a plurality of intersections, at least one covered region and the pixel positions corresponding to each of the at least one covered region according to the detective signal distribution graph and the threshold value distribution graph, in which each of the covered region corresponds to two adjacent intersections; calculating a first area occupied by each of the covered region according to the detective signal distribution graph and a plurality of intersections, in which the first area is surrounded by the detective signal distribution graph and the two adjacent intersections corresponding to the at least one covered region; determining whether an overexposure is occurred in the at least one covered region according to the first area corresponding to the covered region; and correcting the at least one covered region being overexposed and the pixel position corresponding to the covered region if the overexposure is occurred in the at least one covered region.

The invention provides a method for correcting touch signal, including: emitting at least one beam to obtain a detective beam generated by reflecting the at least one beam by at least one reflective element, thereby generating a detective signal distribution graph, in which the detective signal distribution graph indicates a plurality of pixel positions of an optical touching region and a plurality of corresponding signal intensities, and the at least one reflective element is disposed at periphery of the optical touching region; obtaining a plurality of intersections, at least one covered region and the pixel positions corresponding to each of the at least one covered region according to the detective signal distribution graph and the threshold value distribution graph, in which each of the covered region corresponds to two adjacent intersections; calculating a first area occupied by each of the covered region according to the detective signal distribution graph and a plurality of intersections, in which the first area is surrounded by the detective signal distribution graph and the two adjacent intersections corresponding to the at least one covered region; determining whether an overexposure is occurred in the at least one covered region according to the first area corresponding to the covered region; and correcting the at least one covered region being overexposed and the pixel position corresponding to the covered region if the overexposure is occurred in the at least one covered region.

In summary, according to the invention, the detective signal distribution graph and the covered region are obtained by emitting the beam to the blocking object. Whether the overexposure being occurred is determined according to the first area corresponding to the detective signal distribution graph in the covered region. When it is determined that the overexposure is occurred, the corresponding pixel position is then corrected. Whether the touch signal is influenced by the overexposure is then determined, so that the touch signal influenced by the overexposure can be corrected to reduce errors and misjudgments for the touch signal while improving accuracy in optical touch control.

To make the above features and advantages of the disclosure more comprehensible, several embodiments accompanied with drawings are described in detail as follows.

BRIEF DESCRIPTION OF THE DRAWINGS

FIG. 1($b$) is a schematic diagram of an ideal original signal received by a camera module at upper-left corner of FIG. 1($a$).

FIG. 7($a$) and FIG. 7($b$) are schematic diagrams of a covered region influenced by an overexposure and generated by the shielded type optical touch screen according to an embodiment of the invention.

FIG. 8($a$) and FIG. 9($a$) are schematic diagrams in which a first area is calculated according to an embodiment of the invention.

FIG. 8($b$) and FIG. 9($b$) are schematic diagrams in which a second area is calculated according to an embodiment of the invention.

DESCRIPTION OF THE EMBODIMENTS

Figure 4A:
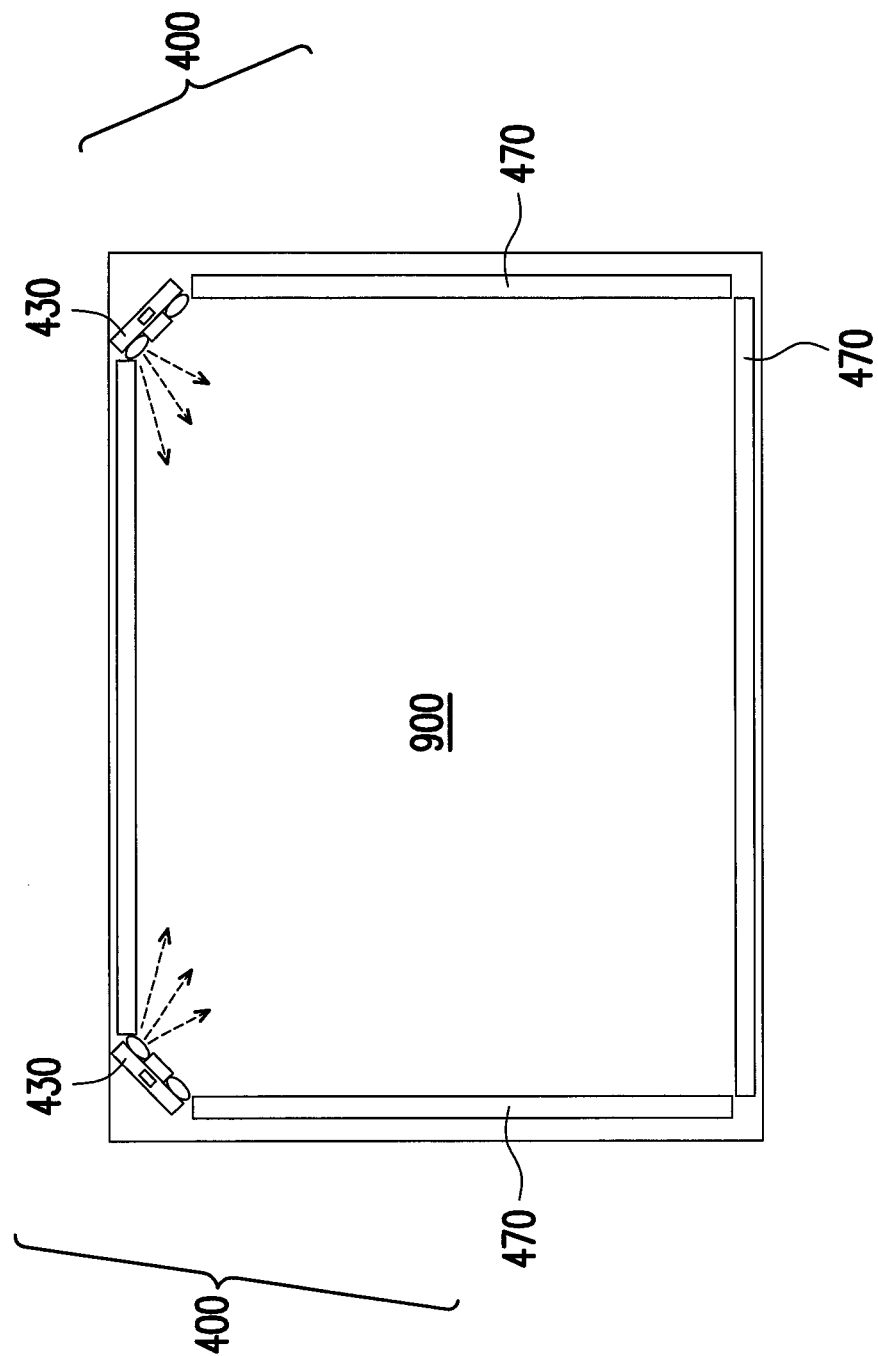
FIG. 4($a$) and FIG. 4($b$) are schematic diagrams of an apparatus for correcting touch signal according to an embodiment of the invention.
Figure 4B:
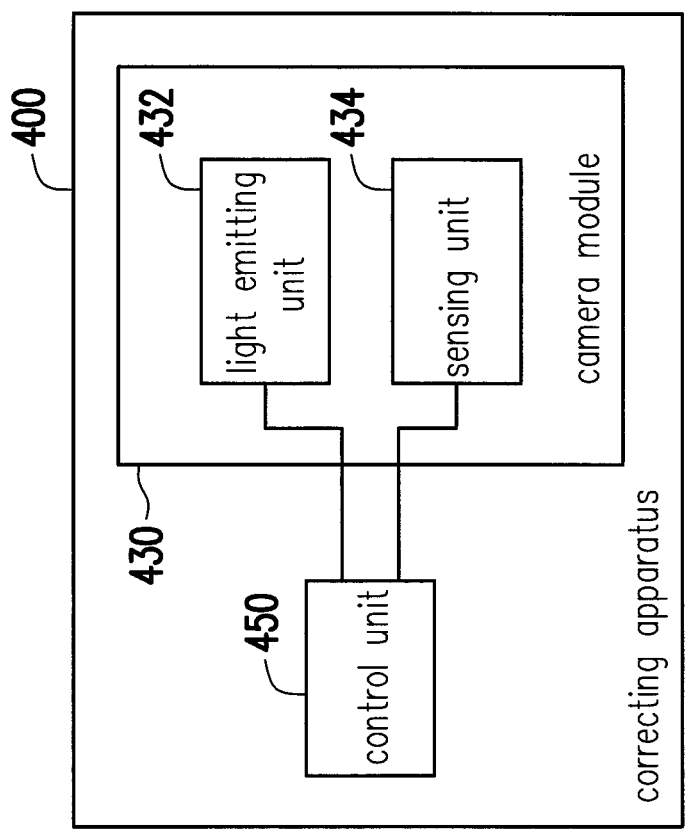

FIG. 4($a$) and FIG. 4($b$) are schematic diagrams of an apparatus for correcting touch signal according to an embodiment of the invention. As shown in FIG. 4($a$), a correcting apparatus 400 is suitable for a shield type optical touch screen 900, and the correcting apparatus 400 includes a camera module 430 and a reflective element 470. The reflective element 470 is disposed at periphery of the shield type optical touch screen 900 besides that the correcting apparatus 400 includes the camera module 430 and the reflective element 470 as depicted in FIG. 4($a$), the correcting apparatus 400 can further include a control unit 450, in which the camera module 430 further includes a light emitting unit 432 and a sensing unit 434, as shown in FIG. 4($b$). The control unit 450 is coupled to the light emitting unit 432 and the sensing unit 434. The light emitting unit 432 can be a light emitting diode (LED) or a light signal transmitter in various forms. In the present embodiment of the invention, the light emitting unit 432 can be disposed at an upper-left corner or an upper-right corner of the shield type optical touch screen 900. However, in another embodiment of the invention, the light emitting unit 432 can be disposed at any position on the shield type optical touch screen 900, and the invention is not limited thereto. The sensing unit 434 can be a light signal receiver in various forms. In the following description, each of the embodiments are illustrated by using a signal received by the sensing unit 434 of the camera module 430 on the upper-left corner as depicted in FIG. 4($a$). The control unit 450 can be a functional module or a microprocessor, in various types.

Figure 5:
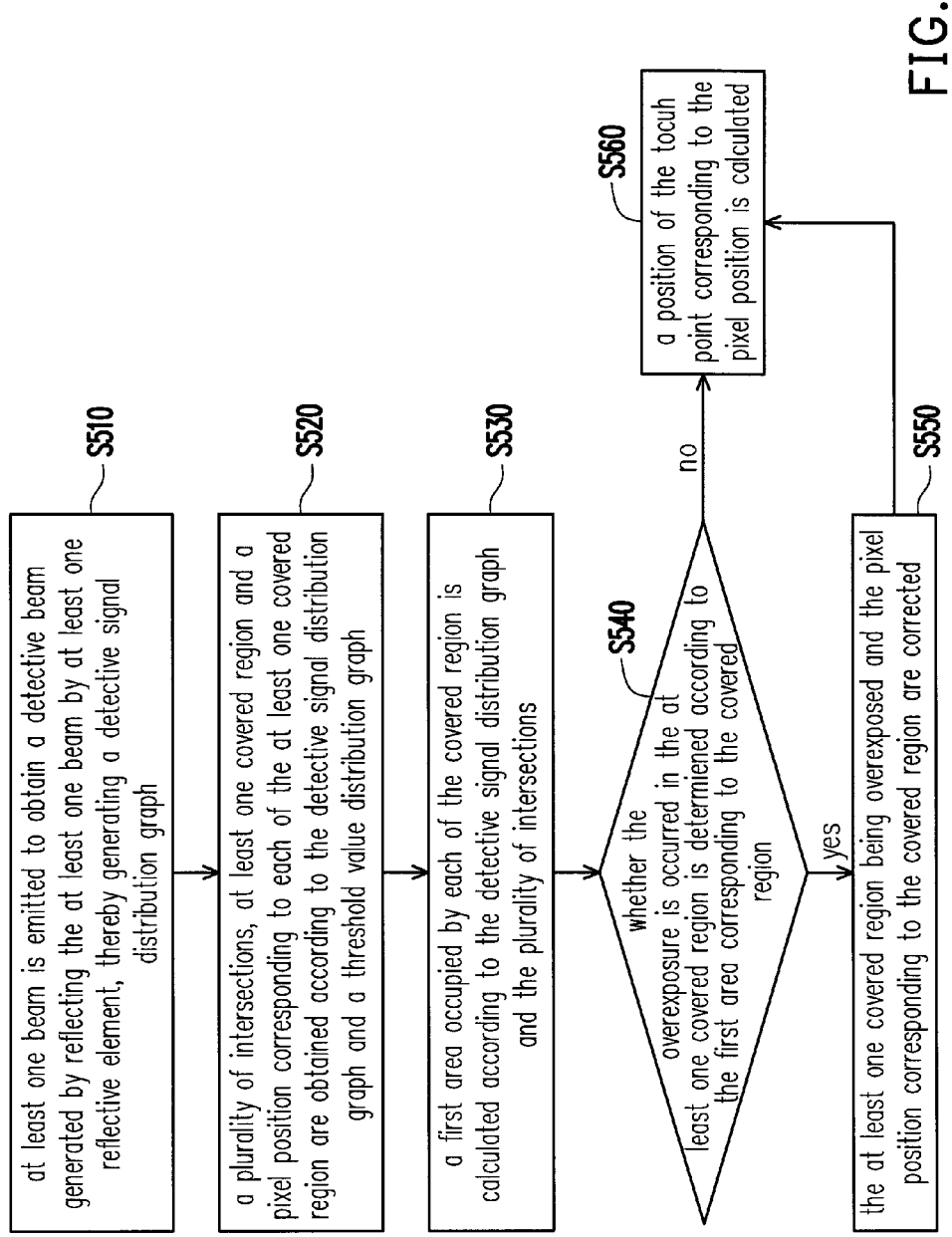
FIG. 5 is a flowchart of a method of correcting touch signal according to an embodiment of the invention.

In the present embodiment of the invention, the correcting apparatus 400 is disposed outside of the shield type optical touch screen 900. In another embodiment of the invention, the correcting apparatus 400 can also be disposed outside of an optical touching region. The reflective element 470 is disposed at periphery of the optical touching region, and the optical touching region can be any plane which is not only limited to optical touch screens. In some of the embodiments in a manner consistent with the scope of the invention, the correcting apparatus 400 and the shield type optical touch screen 900 can be integrated, or partially integrated into one correcting system. Therein, the control unit 450 is coupled to the shield type optical touch screen 900, the light emitting unit 432 and the sensing unit 434 to control them. However, the invention is not limited thereto. FIG. 5 is a flowchart of a method of correcting touch signal according to an embodiment of the invention.

As shown in FIG. 5, the correcting method according to the present embodiment includes steps S510 to S560.

Figure 1A:
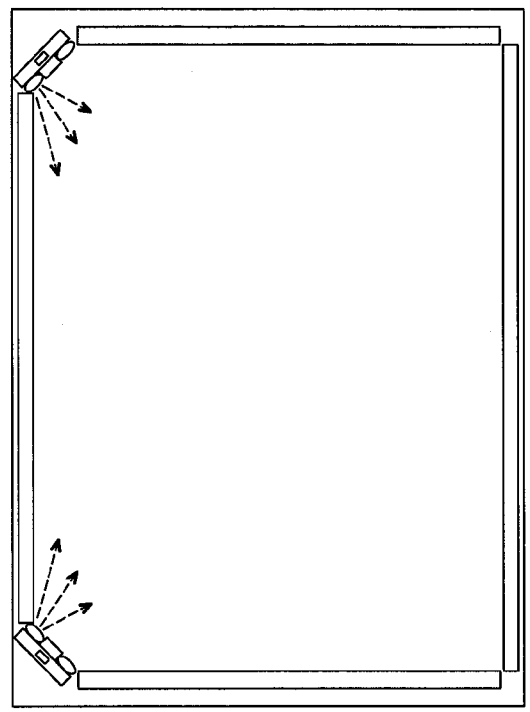
FIG. 1($a$) is a schematic diagram of a shielded type optical touch screen.
Figure 1B:
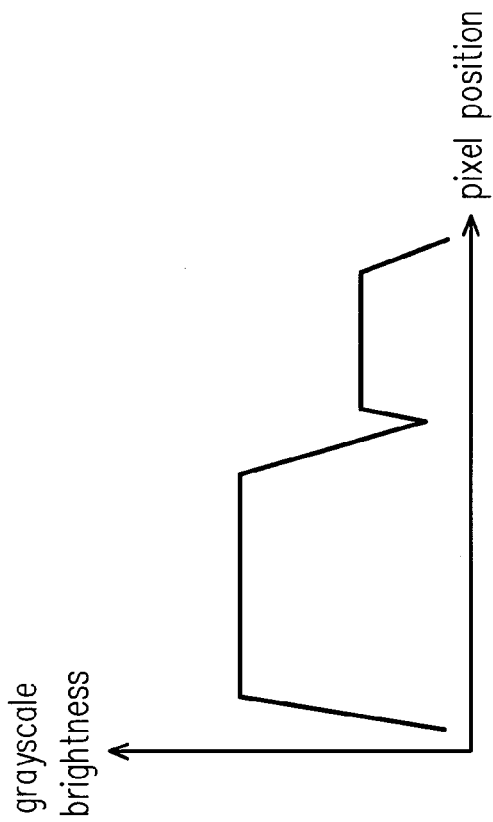
Figure 2B:
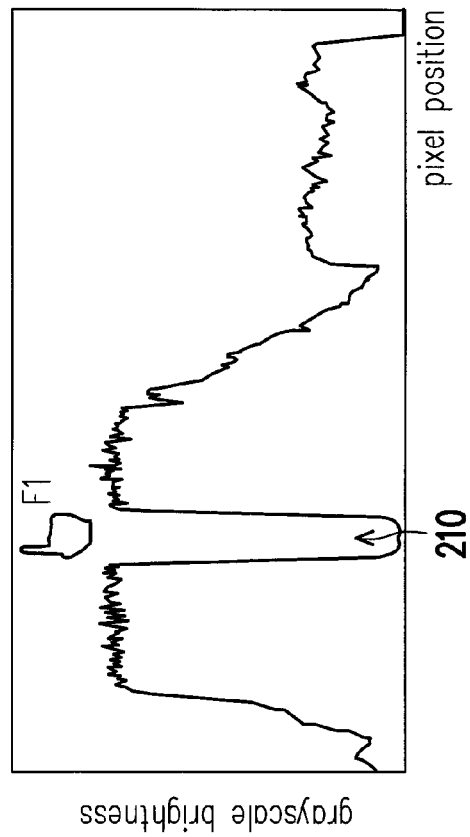
FIG. 2($a$) and FIG. 2($b$) are schematic diagrams of a covered region generated by the shielded type optical touch screen.
Figure 2A:
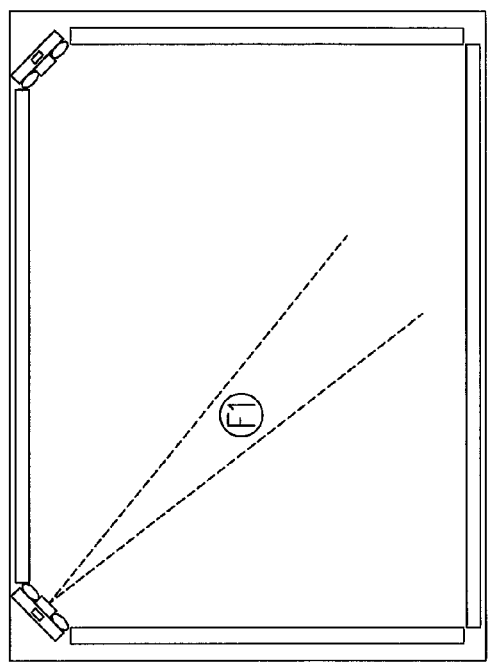
Figure 3B:
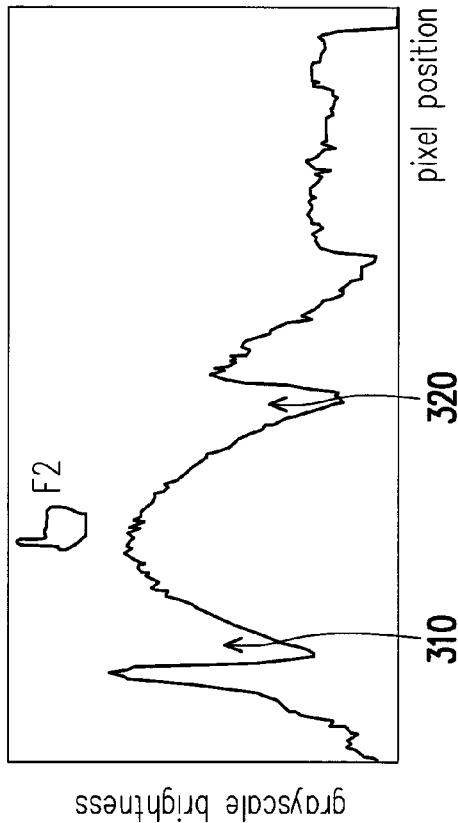
FIG. 3($a$) and FIG. 3($b$) are schematic diagrams of the covered region influenced by an overexposure and generated by the shielded type optical touch screen.
Figure 3A:
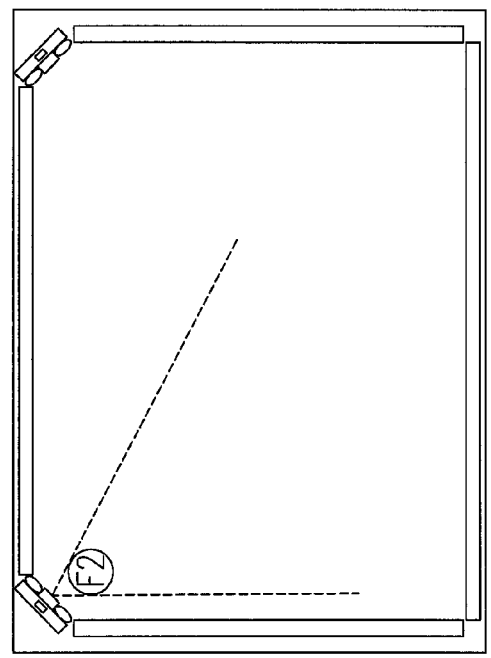
Figure 6B:
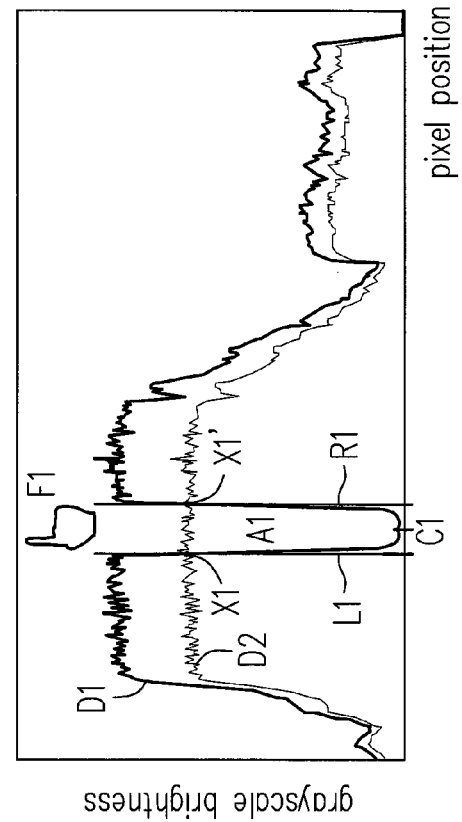
FIG. 6($a$) and FIG. 6($b$) are schematic diagrams of a covered region generated by the shielded type optical touch screen according to an embodiment of the invention.
Figure 6A:
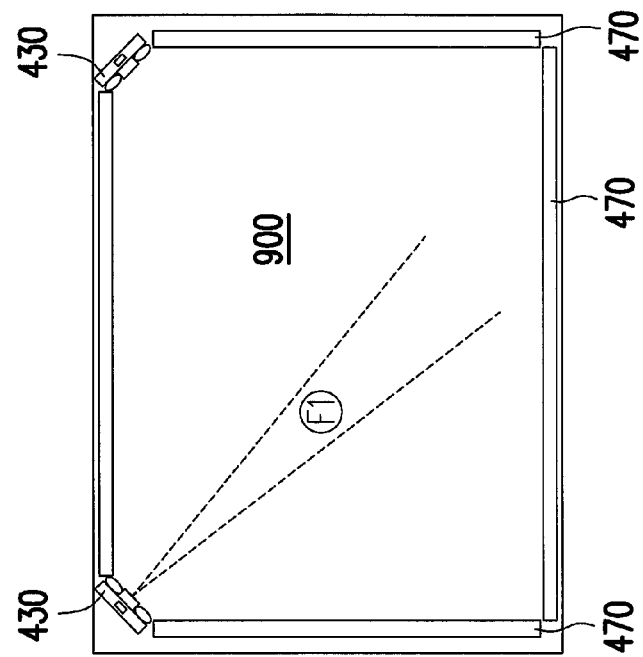

In step S510, the light emitting unit 432 emits at least one beam, so that the sensing unit 434 can obtain a detective beam generated by reflecting at least one beam by at least one reflective element 470, thereby generating a detective signal distribution graph. Therein, the detective signal distribution graph represents a plurality of pixel positions corresponding to a plurality of signal intensities in the shield type optical touch screen 900 (or the optical touching region according to another embodiment). For instance, when the user does not place a finger on the shield type optical touch screen 900, the light emitting unit 432 can emit the beam to generate an original signal distribution graph in which an original signal is received by the sensing unit 434, as shown in FIG. 1(b). FIG. 6(a) and FIG. 6(b) are schematic diagrams of a covered region generated by the shielded type optical touch screen 900 according to an embodiment of the invention. FIG. 7(a) and FIG. 7(b) are schematic diagrams of a covered region influenced by an overexposure and generated by the shielded type optical touch screen 900 according to an embodiment of the invention. When the user places the finger (refers to F1 in FIGS. 6(a) and 67(b), or F2 in FIGS. 7(a) and 7(b)) on the shield type optical touch screen 900, the finger covers a partial of the beam emitted by the light emitting unit 432. The beam not being covered by the finger can be reflected by the reflective element 470 back to the sensing unit 434, so as to form the detective signal distribution graph as shown in curves marked as D1 in FIG. 6(a) and FIG. 7(b). Since the detective signal distribution graph is formed by covering with the finger, in comparison to the original signal distribution graph, a region with the signal intensity being weaker is generated on the pixel position (e.g., as illustrated by an area region A1 in FIG. 6(b)) corresponding to the finger.

In step S520, the control unit 450 obtains a plurality of intersections, at least one covered region and a pixel position corresponding to each of the at least one covered region according to the detective signal distribution graph and a threshold value distribution graph. Therein, the threshold value distribution graph (curves marked as D2 in FIG. 6(b) and FIG. 7(b)) is generated according to a specific proportion of an original signal distribution graph. As described above, the original signal distribution graph is generated without blocking objects provided in the shield type optical touch screen 900 (or the optical touching region according to another embodiment), by obtaining an original beam generated by reflecting the at least one beam by the at least one reflective element 470. Since the detective signal distribution graph can have the region with the signal intensity being weaker with respective to the original signal distribution graph, thus it is possible to define a threshold value for the signal according to the specific proportion (e.g., 75%), and all regions having signals lower than the signal of the threshold value can then be determined as the covered regions (e.g., the regions A1 to A3). Further, in this step, the control unit 450 can also calculate an amount of the covered regions as a basis of determining whether the overexposure is occurred. As shown in FIG. 6(a) and FIG. (b), the pixel positions of the covered region can be corresponded to a touch point in the shield type optical touch screen 900 (or the optical touching region according to another embodiment of the invention). Nevertheless, errors and misjudgments may also occurred due to the influence of the overexposure, as shown in FIG. 7(a) and FIG. 7(b). The covered region can be obtained according to the intersections of the detective signal distribution graph and the threshold value distribution graph. In the present embodiment of the invention, the intersections can be crossing points (x1 and x1' in FIGS. 6(b), x2 and x2', and x3 and x3' in FIG. 7(b)) of the detective signal distribution graph and the threshold value distribution graph. The intersections can be used to define each of the covered regions, in which two adjacent intersections can correspond to one of the covered regions. For instance, x1 and x1' in FIG. 6(b) are corresponding to A1; x2 and x2' in FIG. 7(b) are corresponding to A2; and x3 and x3' in FIG. 7(b) are corresponding to A3. In another embodiment of the invention, the intersections can also be obtained according to a relation between slopes of the detective signal distribution graph and the threshold value distribution graph or various other methods, and the invention is not limited thereto.

Figure 9A:
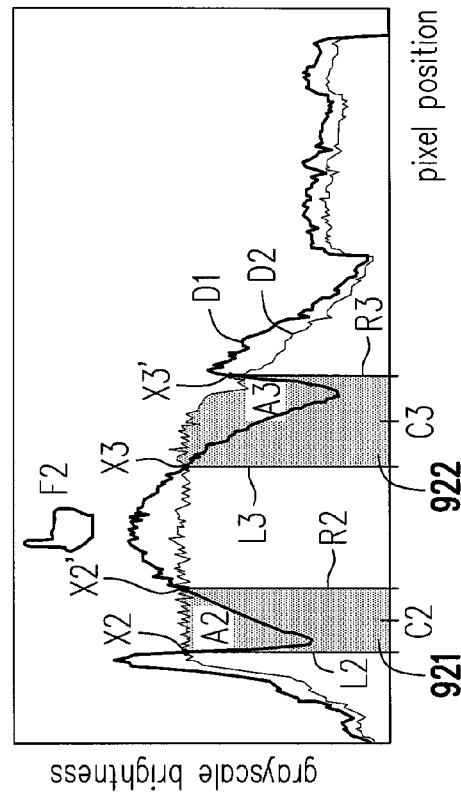

In step S530, the control unit 450 calculates a first area occupied by each of the covered region according to the detective signal distribution graph and the plurality of intersections (e.g., areas 811, 911 and 912 as illustrated in solid areas of FIG. 8(a) and FIG. 9(a)). Therein, the first area is surrounded by the detective signal distribution graph and the two adjacent intersections corresponding to the at least one covered region. FIG. 8(a) and FIG. 9(a) are schematic diagrams in which a first area is calculated according to an embodiment of the invention. For instance, referring to the areas 811, 911 and 912 as illustrated in solid areas of FIG. 8(a) and FIG. 9(a), in which the first areas 811, 911 and 912 are respectively surrounded by the intersections (x1 and x1', x2 and x2', and x3 and x3') respectively corresponding to the detective signal distribution graph in each of the covered regions. More specifically, the first areas 811, 911 and 912 are areas respectively surrounded by vertical lines L1 and R1, L2 and R2, L3 and R3 (which are respectively passing through the intersections x1 and x1', x2 and x2', and x3 and x3') and each of the detective signal distribution graphs. In other words, the first area is an amount of the grayscale brightness of the detective signal distribution graph (which is represented by FGV below) in the corresponding covered region, i.e., $$\sum_{i=L}^{R} FGV(i),$$

in which i being the pixel position corresponding to the covered region, L being a left border corresponding to the covered region (e.g., corresponding to x1, x2 and x3), R being a right border corresponding to the covered region (e.g., corresponding to x1', x2' and x3'). After each of the covered region is obtained by the control unit 450, the first area occupied by each of each of the covered region in the detective signal distribution graph can be obtained, and the first area can be used to determine whether the overexposure is occurred, detailed description thereof is further provided below.

In step S540, the control unit 450 determines whether the overexposure is occurred in the at least one covered region according to the first area corresponding to the covered region. In the present embodiment of the invention, the control unit 450 can determine whether the overexposure is occurred in the covered region by determining whether the first area corresponding to the covered region is greater than a corresponding area threshold value. The so-called "area threshold value" is a parameter that can be set by persons who apply the present embodiment, once the first area is greater than the area threshold value, the control unit 450 can confirm that the overexposure is occurred. The parameter of the area threshold value can be obtained from the implementation with certain degree, and the area threshold can also be dynamically adjusted according to information including the first area, the threshold value distribution graph and so on.

As shown in FIG. 8(a), when the first area corresponding to the covered region is relatively smaller, this indicates that the finger F1 of the user fully covers the beam on the corresponding touch point so as to lower the signal intensity. As shown in FIG. 9(a), when the first areas 911 and 912 corresponding to the covered regions A2 and A3 are relatively larger (e.g., when the first areas 911 and 912 are both greater than the preset area threshold value), this indicates that the finger F2 of the user does not fully cover the beam on the corresponding touch point in the shield type optical touch screen 900 (or the optical touching region according to another embodiment of the invention), resulting effects such as diffraction to occur between the finger and the camera module. Therefore, when the first areas 911 and 912 are greater than the corresponding area threshold value, it can be determined that the overexposure is occurred. If it is determined that the overexposure is not occurred, in step S560, the control unit 450 can calculate the corresponding position of the touch point of the pixel position being obtained. Such calculation can be done by using trigonometric function or various other mathematical algorithms and the invention is not limited thereto.

In step S550, the control unit 450 corrects the at least one covered region being overexposed and the pixel position corresponding to the covered region if the overexposure is occurred in the at least one covered region. If it is determined that the overexposure is occurred in the covered region, this indicates that the pixel position being previously obtained for calculating the corresponding position of the touch point may have errors or misjudgments, thus, the pixel position being previously obtained can first be corrected. After the correction is completed, in step S560, the corresponding position of the touch point can be calculated according to the pixel position being corrected. Detailed content of above correcting process is described below.

Figure 10:
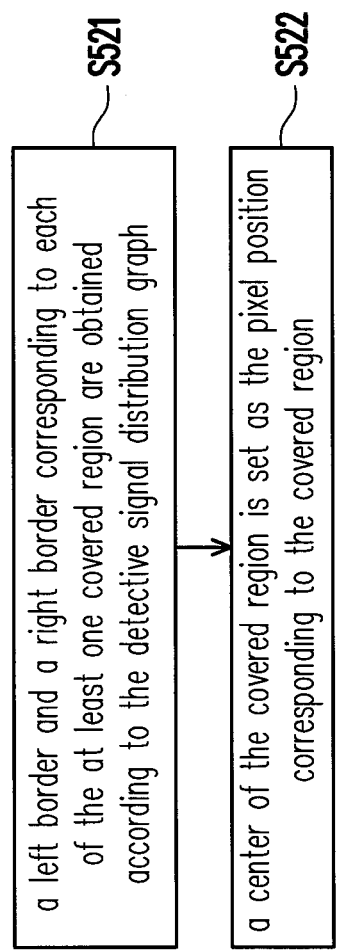
FIG. 10 is a flowchart of a method of correcting touch signal according to another embodiment of the invention.

FIG. 10 is a flowchart of a method of correcting touch signal according to another embodiment of the invention. In the present embodiment of the invention, step S520 of the correcting method of FIG. 5 can include S521 to S522 depicted in FIG. 10. A difference between the present embodiment and the forgoing embodiment is described in detail below. Details and steps regarding the control unit 450 for obtaining the pixel position corresponding to the touch point are described below.

In step S521, the control unit 450 obtains a left border and a right border with each of the at least one covered region according to the detective signal distribution graph. The left border and the right border pass through the two adjacent intersections corresponding to the at least one covered region, respectively. As shown in FIGS. 6(b) and 7(b), the control unit 450 can define the borders of each covered region and the pixel position of the border by the vertical lines L1 and R1, L2 and R2, L3 and R3 which are respectively passing through the intersections x1 and x1', x2 and x2', and x3 and x3'. In other words, the left border L1 and the right border R1 of the covered region A1 can be defined respectively by x1 and x1'; the left border L2 and the right border R2 of the covered region A2 can be defined respectively by x2 and x2'; and the left border L3 and the right border R3 of the covered region A3 can be defined respectively by x3 and x3'.

In step S522, the control unit 450 sets a center between the left border and the right border as the pixel position corresponding to each of the at least one covered region. As shown in FIG. 6(b) and FIG. 7(b), the control unit 450 can set a center C1 between L1 and R1, a center C2 between L2 and R2, and a center C3 between L3 and R3, as the corresponding pixel positions of the covered region A1, the covered region A2, the covered region A3, respectively.

Figure 11:
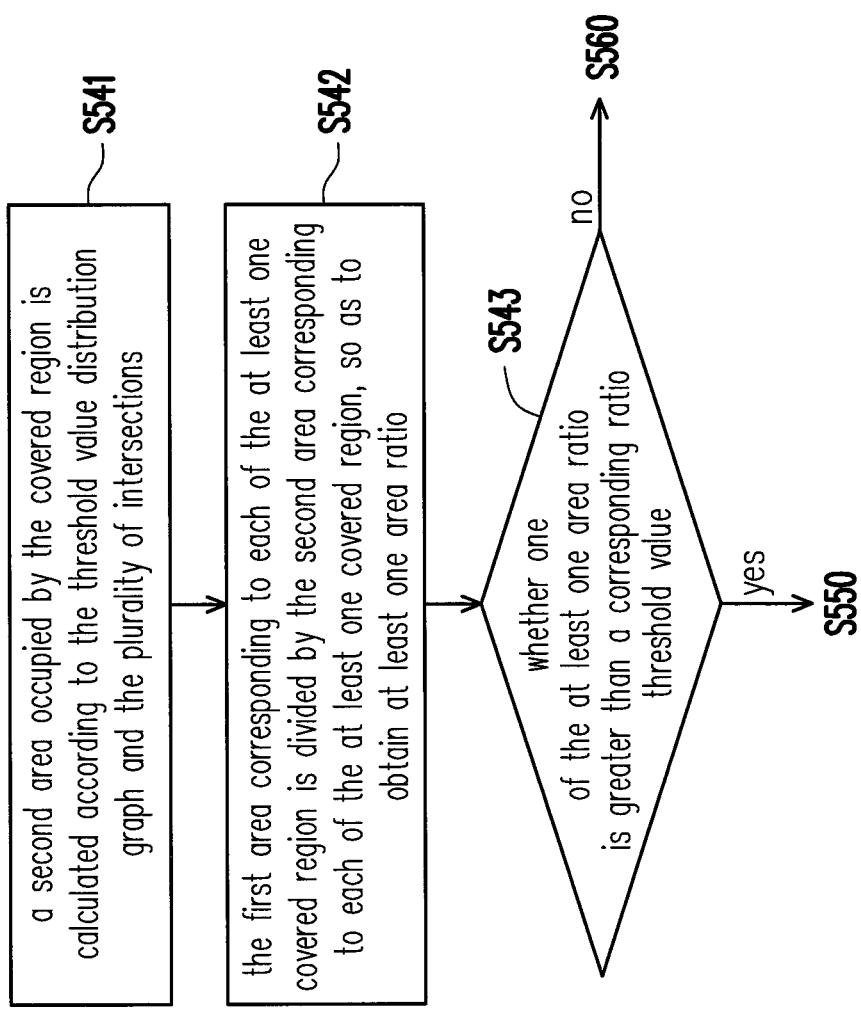
FIG. 11 is a flowchart of a method of correcting touch signal according to another embodiment of the invention.

FIG. 11 is a flowchart of a method of correcting touch signal according to another embodiment of the invention. In the present embodiment of the invention, step S540 of the correcting method of FIG. 5 can include S541 to S543 depicted in FIG. 11. A difference of techniques between the present embodiment and the forgoing embodiment is described in detail below. Another method regarding the control unit 450 for determining whether the overexposure is occurred in the covered region is described below.

Figure 9B:
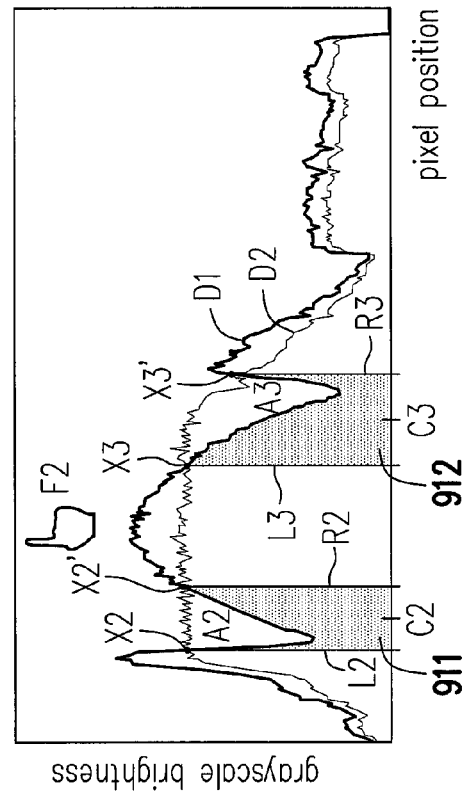

In step S541, the control unit 450 calculates a second area occupied by the covered region according to the threshold value distribution graph and the plurality of intersections. Therein, the second area is surrounded by the threshold value distribution graph and the two adjacent intersections corresponding to the at least one covered region. Examples are illustrated with reference to FIG. 8(b) and FIG. 9(b). FIG. 8(b) and FIG. 9(b) are schematic diagrams in which a second area is calculated according to an embodiment of the invention. For instance, referring to the areas 821, 921 and 922 as illustrated in solid areas of FIG. 8(b) and FIG. 9(b), in which the second areas 821, 921 and 922 are respectively surrounded by the intersections (x1 and x1', x2 and x2; and x3 and x3') respectively corresponding to the threshold value distribution graph in each of the covered regions (A1, A2 and A3), the left borders (L1, L2 and L3) and the right borders (R1, R2 and R3) passing through the intersections, and x-axises of the detective signal distribution graphs. More specifically, the second areas 821, 921 and 922 are areas respectively surrounded by vertical lines L1 and R1, L2 and R2, L3 and R3 (which are respectively passing through the intersections x1 and x1', x2 and x2', and x3 and x3') and each of the threshold value distribution graphs. In other words, the second area (the solid areas of FIG. 8(b) and FIG. 9(b)) is an amount of the grayscale brightness of background signals of the threshold value distribution graph (which is represented by BGV below) in the corresponding covered region, i.e., $$\sum_{i=L}^{R} BGV(i),$$

in which i being the pixel position corresponding to the covered region, L being the left border corresponding to the covered region (e.g., corresponding to x1, x2 and x3), R being the right border corresponding to the covered region (e.g., corresponding to x1', x2' and x3').

In step S542, the control unit 450 divides the first area corresponding to each of the at least one covered region by the second area corresponding to each of the at least one covered region, so as to obtain at least one area ratio. The area ratio (which is represented by AFR below) corresponding to each of the covered region can be obtained by the following function (1).

$$AFR = \frac{\sum_{i=L}^{R} FGV(i)}{\sum_{i=L}^{R} BGV(i)} \quad (1)$$

As described above, i being the pixel position corresponding to the covered region, L being the left border corresponding to the covered region, R being the right border corresponding to the covered region. As the area ratio gets higher, a possibility of determining that the overexposure is occurred in the corresponding covered region also gets higher.

In step S543, the control unit 450 determines whether one of the at least one area ratio is greater than a corresponding ratio threshold value. After the area ratio of each of the covered regions is calculated, the control unit 450 can compare the area ratio with the corresponding ratio threshold value. If one of the at least one area ratio is greater than the corresponding ratio threshold value, it can be determined that the overexposure is occurred in the at least one covered region corresponding to the at least one area ratio, and proceeding to step S550. If a result of such determination is no, proceeding to step S560. It should be noted that, the so-called "ratio threshold value" is a parameter that can be set by persons who apply the present embodiment, and the parameter of the ratio threshold value can be obtained from the implementation with certain degree.

Figure 12:
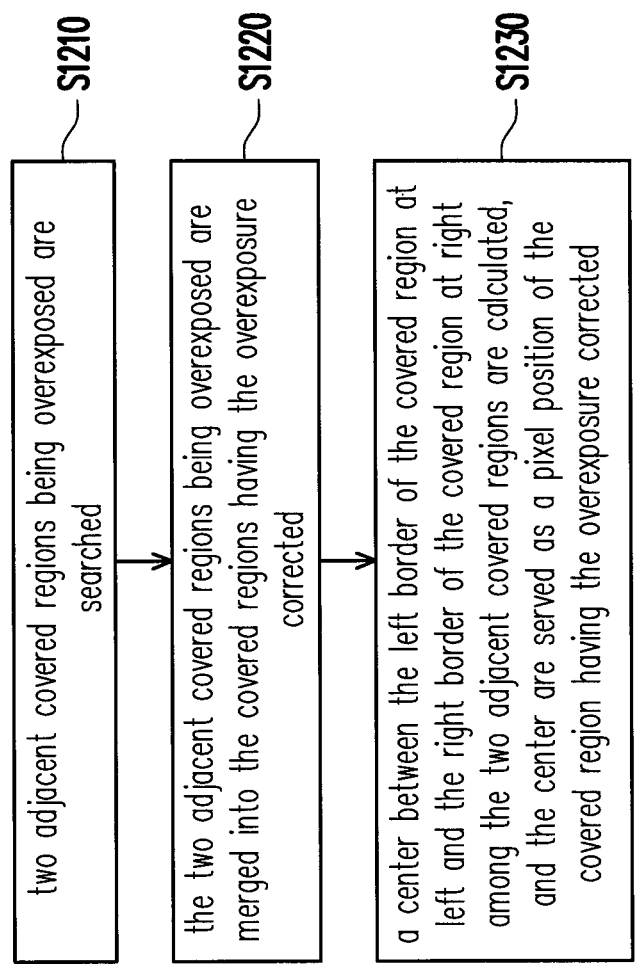
FIG. 12 is a flowchart of a method of correcting touch signal according to another embodiment of the invention.

FIG. 12 is a flowchart of a method of correcting touch signal according to another embodiment of the invention. In the present embodiment of the invention, step S550 of the correcting method of FIG. 5 can include S1210 to S1230 depicted in FIG. 12. A difference between the present embodiment and the forgoing embodiment is described in detail below. FIG. 13(a), FIG. 13(b), FIG. 14(a) and FIG. 14(b) are schematic diagrams of a method for correcting touch signal according to another embodiment of the invention. Details regarding the control unit 450 for correcting the pixel position are described below.

In step S1210, the control unit 450 searches for two adjacent covered regions being overexposed. For instance, as shown FIG. 13(a), the covered regions A2 and A3 are formed by the one single finger F2 of the user on the screen, the control unit 450 can determine that A2 and A3 are the two adjacent covered regions being overexposed. For instance, as shown FIG. 14(a), covered regions A4, A5 and A6 are formed by two fingers F3 and F4 of the user on the screen, so that the control unit 450 can determine that A4 and A5 are the two adjacent covered regions being overexposed (with the overexposure caused by the finger F3).

Figure 13B:
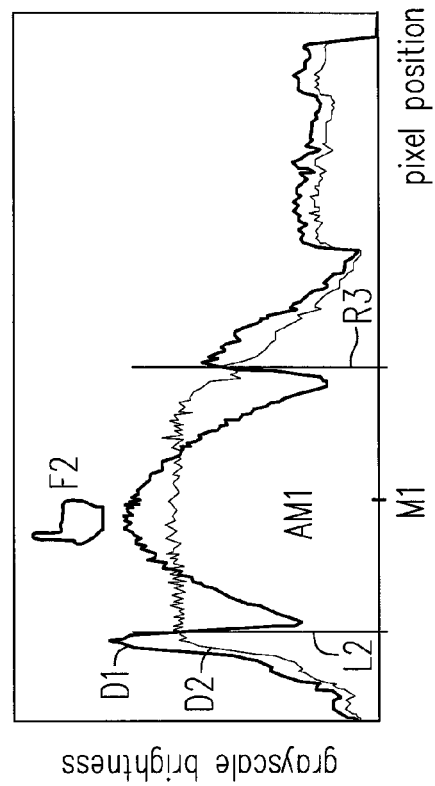
FIG. 13($a$), FIG. 13($b$), FIG. 14($a$) and FIG. 14($b$) are schematic diagrams of a method for correcting touch signal according to another embodiment of the invention.
Figure 13A:
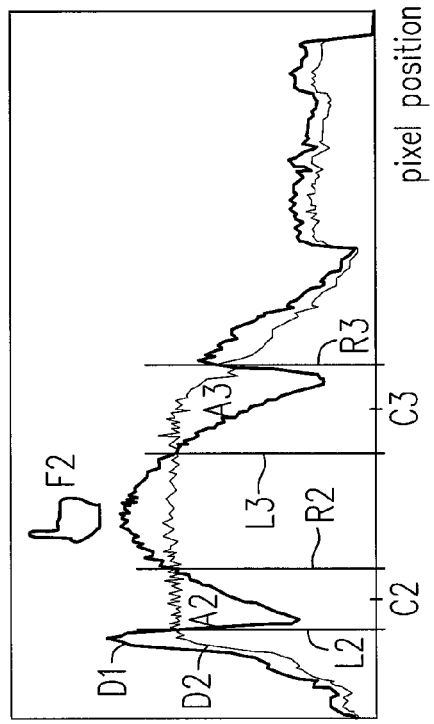

In step S1220, the control unit 450 merges the two adjacent covered regions being overexposed into the covered regions having the overexposure corrected. For instance, when the control unit 450 determines that A2 and A3 are the two adjacent covered regions being overexposed, the covered regions A2 and A3 can be merged into AM1, and the region AM1 is set as the covered region having the overexposure corrected, as shown in FIG. 13(b). For instance, as shown in FIG. 14(a), when the control unit 450 determines that A4 and A5 are the two adjacent covered regions being overexposed (with the overexposure caused by the finger F3), the covered regions A4 and A5 can be merged into AM2, and the region AM2 is set as the covered region having the overexposure corrected, as shown in FIG. 14(b).

In step S1230, the control unit 450 calculates a center between the left border of the covered region at left and the right border of the covered region at right among the two adjacent covered regions, and the center being served as a pixel position of the covered region having the overexposure corrected. For instance, as shown in FIG. 13(b), the control unit 450 searches for a center M1 between the left border L2 of the covered region A2 and the right border R3 of the covered region A3, and the center is served as the pixel position of the covered region AM1 having the overexposure corrected. For instance, as shown in FIG. 14(b), the control unit 450 searches for a center M2 between the left border L4 of the covered region A4 and the right border R5 of the covered region A5, and the center is served as the pixel position of the covered region AM2 having the overexposure corrected. Since C2 and C3, and C4 and C5 are results measured under influence of the overexposure, thus in the present embodiment, by replacing C2 and C3 with M1, and replacing C4 and C5 with M2, respectively, an actual touch control status of the fingers of the user can then be obtained.

Figure 15:
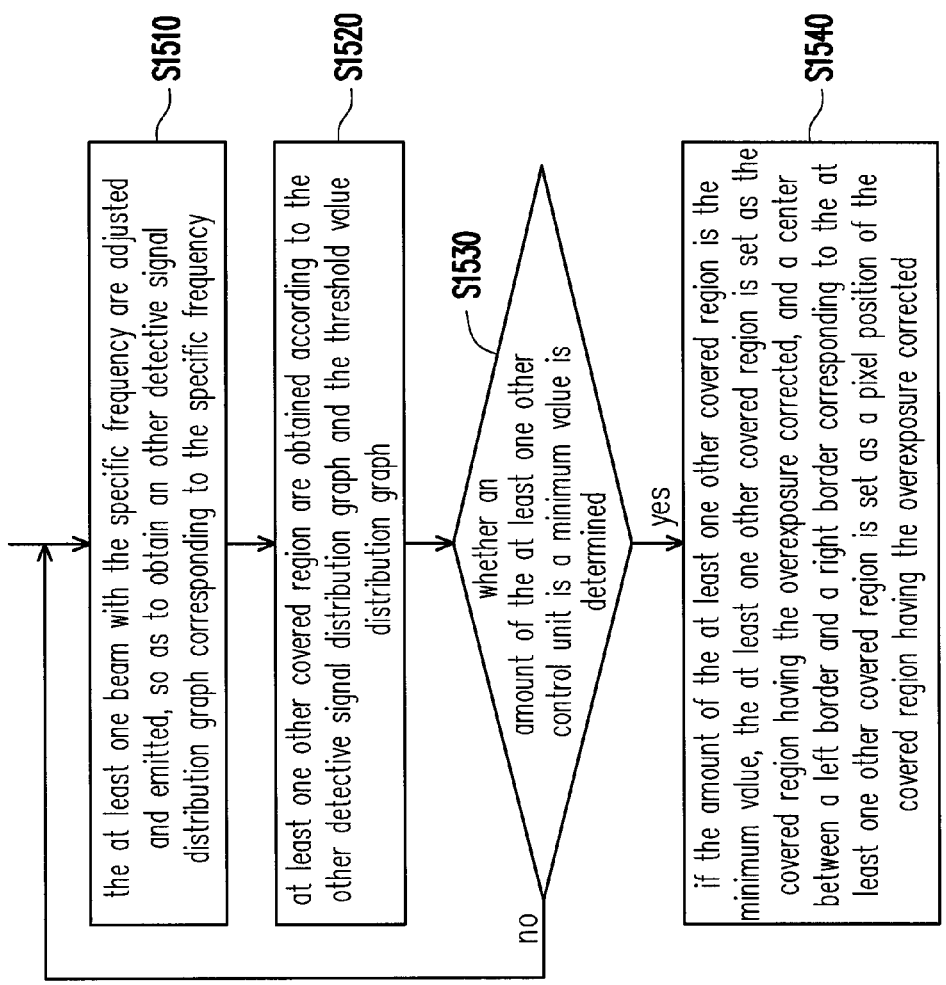
FIG. 15 is a flowchart of a method of correcting touch signal according to another embodiment of the invention.
Figure 16A:
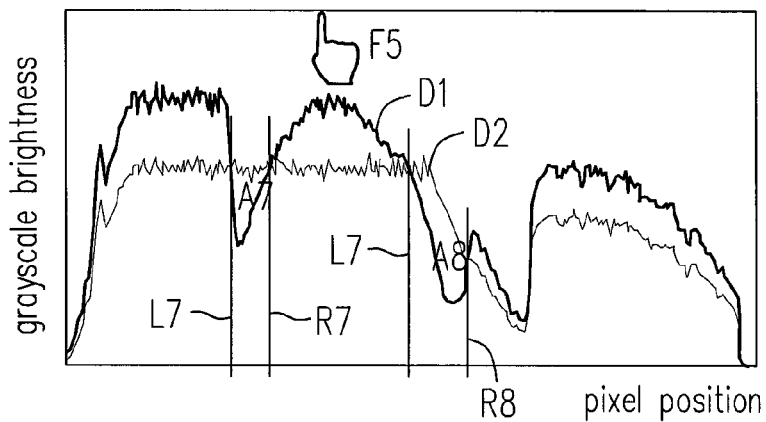
FIGS. 16($a$), 16($b$) and 16($c$) are schematic diagrams of a method of correcting touch signal according to another embodiment of the invention.
Figure 16B:
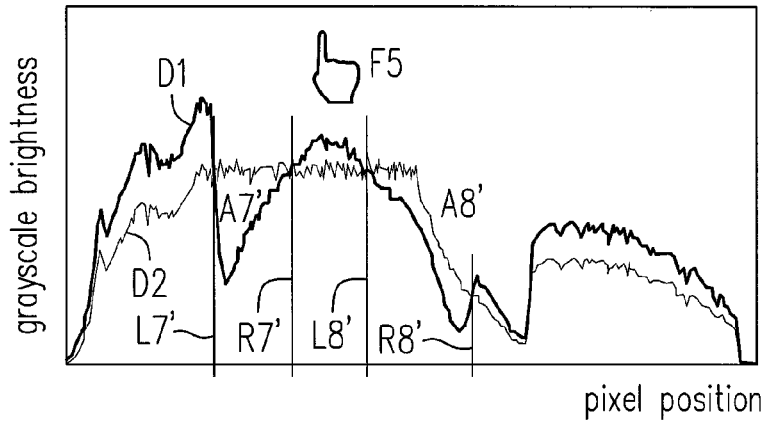
Figure 16C:
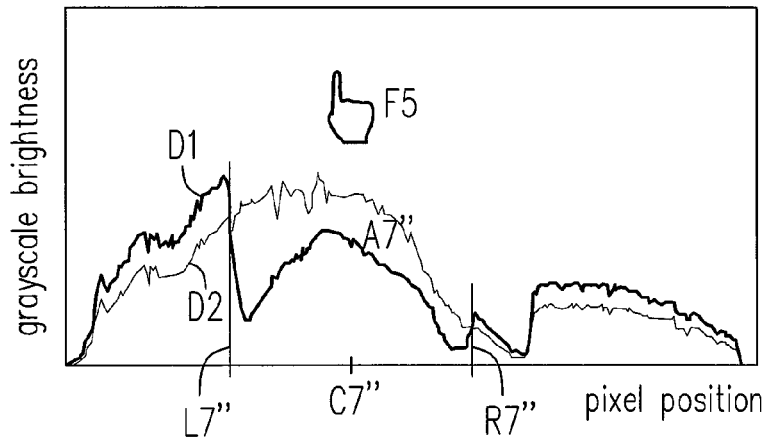

FIG. 15 is a flowchart of a method of correcting touch signal according to another embodiment of the invention. In the present embodiment of the invention, step S550 of the correcting method of FIG. 5 can include S1510 to S1540 depicted in FIG. 15. A difference between the present embodiment and the forgoing embodiment is described in detail below. FIGS. 16(a), 16(b) and 16(c) are schematic diagrams of a method of correcting touch signal according to another embodiment of the invention. Details regarding another method for correcting the pixel position are described below. In the present embodiment of the invention, the at least one beam emitted by the light emitting unit 432 has a specific frequency.

In step S1510, the control unit 540 adjusts and emits the at least one beam with the specific frequency through the light emitting unit 432, so as to obtain an other detective signal distribution graph corresponding to the specific frequency. The overexposure is a result caused by the original signal intensity in the covered region which becomes stronger due to light reflection generated by the fingers of the user. Therefore, in the present embodiment of the invention, an other detective signal distribution graph can be obtained by lowering the specific frequency during the correcting process, so as to lower the influence of the light reflection to the overexposure. The curve marked as D1 in FIG. 16(a) is the detective signal distribution graph obtained before the specific frequency is adjusted by the control unit 450. The curves marked as D1 in FIG. 16(b) and FIG. 16(c) are the other detective signal distributions graph respectively obtained after the specific frequency of the light emitting unit 432 is lowered, and obtained after the at least one beam with the specific frequency is again lowered, by the control unit 450.

In step S1520, the control unit 450 obtains at least one other covered region according to the other detective signal distribution graph and the threshold value distribution graph. After the specific frequency is adjusted, the process of obtaining the other covered regions according to the intersections between the other detective signal distribution graph and the threshold value distribution graph is identical to the process of obtaining the covered region in step S521, thus related description is omitted hereinafter. In the present embodiment of the invention, the control unit 450 can correspondingly adjust the threshold value distribution graph according to the specific frequency being adjusted. For instance, during initial stage, the control unit can obtain the threshold value distribution graph (e.g., the curve marked as D2 in FIG. 15(a)) according to the specific proportion of the original signal distribution graph being 75%. During correcting stage, the control unit can obtain the corresponding threshold value distribution graphs (e.g., the curves marked as D2 in FIG. 15(b) and FIG. 15(c)), respectively according to the specific proportions of the original signal distribution graphs being 60% and 50%. In another embodiment of the invention, the control unit 450 can also correspondingly adjust the threshold value distribution graph according to the specific proportion of the original signal distribution graph and the other detective signal distribution graph, or the threshold value distribution graph can be correspondingly adjusted according to other methods, and the invention is not limited thereto.

In step S1530, the control unit 450 determine whether an amount of the at least one other control unit is a minimum value. For instance, during initial stage, as shown in FIG. 16(a), the control unit 450 determines that two covered regions A7 and A8 being overexposed are provided. After the specific frequency is adjusted in correcting stage, as shown in FIG. 16(b), the amount is still 2 despite that the other covered regions A7' and A8' have been obtained. After the specific frequency is adjusted once again when returning back to step S1510, the other covered region A7" is obtained with the amount being 1, as shown in FIG. 16(c), and such amount is the minimal value of the covered region which can be possibly formed by one finger F5. In other words, the influence of the light reflection to the overexposure has indeed been lowered.

In step S1540, if the amount of the at least one other covered region is the minimum value, the control unit 450 sets the at least one other covered region as the covered region having the overexposure corrected, and sets a center between a left border and a right border corresponding to the at least one other covered region as a pixel position of the covered region having the overexposure corrected. For instance, as shown in FIG. 16(c), since only single one of the other covered region is left, a center C7" between the left border L7" and the right border R7" can be set as a pixel position corresponding to the other covered region A7". In this case, the obtained pixel position C7" corresponding to the other covered region A7" can then be corresponding to the touch point of the user. In other word, the other covered region having the amount being the minimum value can represent the practical touching state of the fingers of the user, such that the control unit 50 can complete the correction by replacing the pixel position corresponding to the covered region being previously obtained with the pixel position of the other covered region having the amount being the minimum value. It is illustrated herein with the amount of the covered region possibly formed by the one finger F5 being 1 as an example, whereas for multi-fingers touching, different amounts of the other covered region can also be adopted, and the invention is not limited thereto. Similarly, after the correction is completed, in step S560, the corresponding position of the touch point can be calculated according to the pixel position being corrected.

Figure 17:
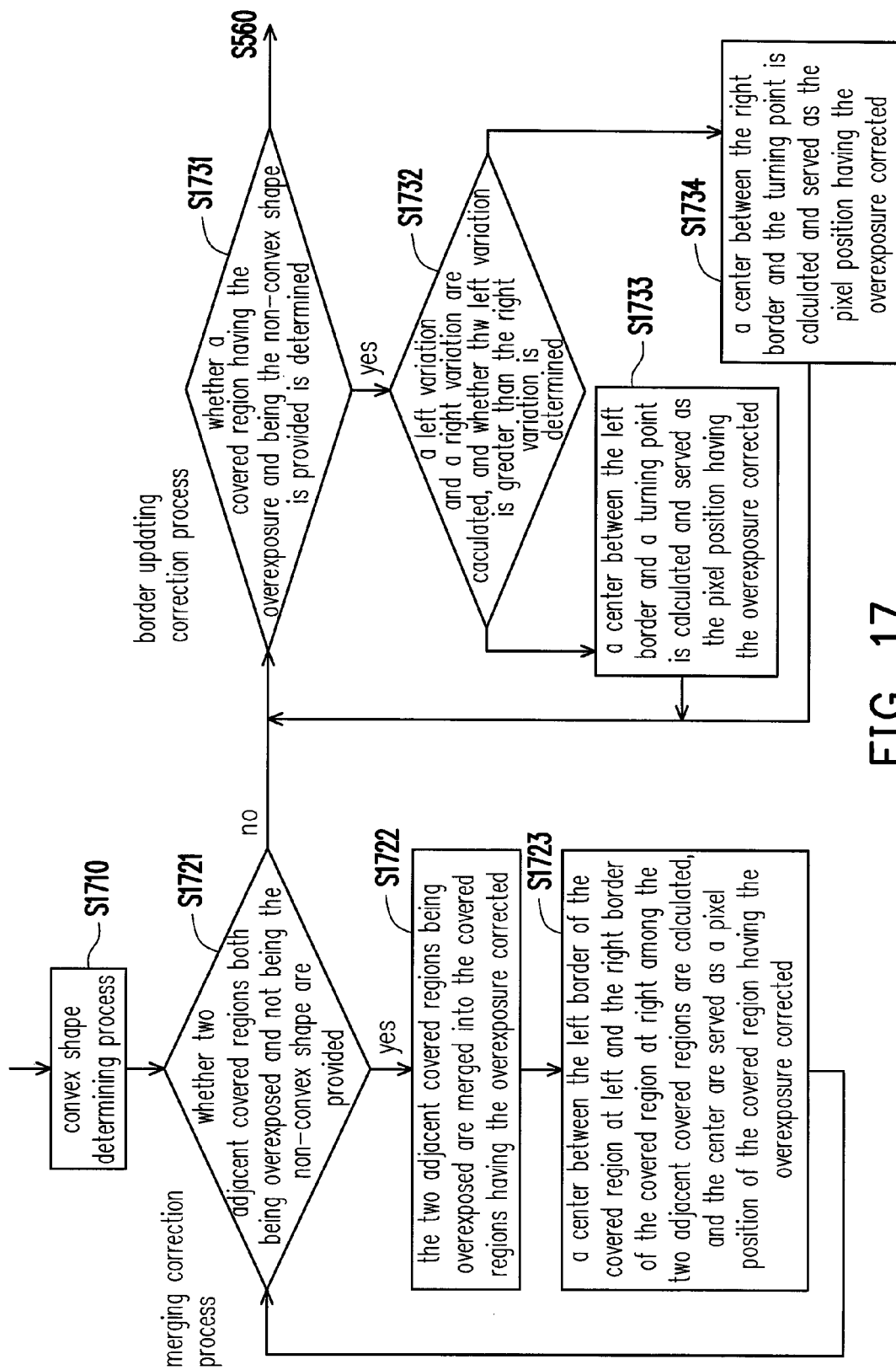
FIG. 17 is a flowchart of a method of correcting touch signal according to another embodiment of the invention.

FIG. 17 is a flowchart of a method of correcting touch signal according to another embodiment of the invention. As shown in FIG. 17, in the resent embodiment of the invention, step S550 of the correcting method according to the present embodiment includes steps S1710, S1721 to S1723, and S1731 to S1734. A difference between the present embodiment and the forgoing embodiment is described in detail below.

Figure 18:
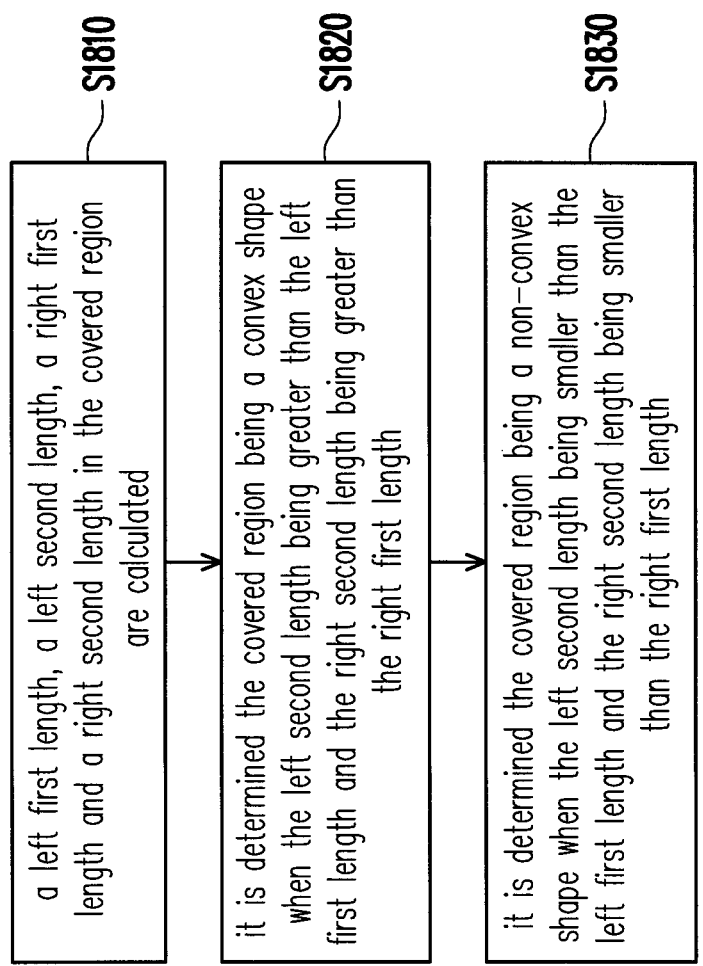
FIG. 18 is a flowchart of a convex shape determining process according to an embodiment of the invention.
Figure 19B:
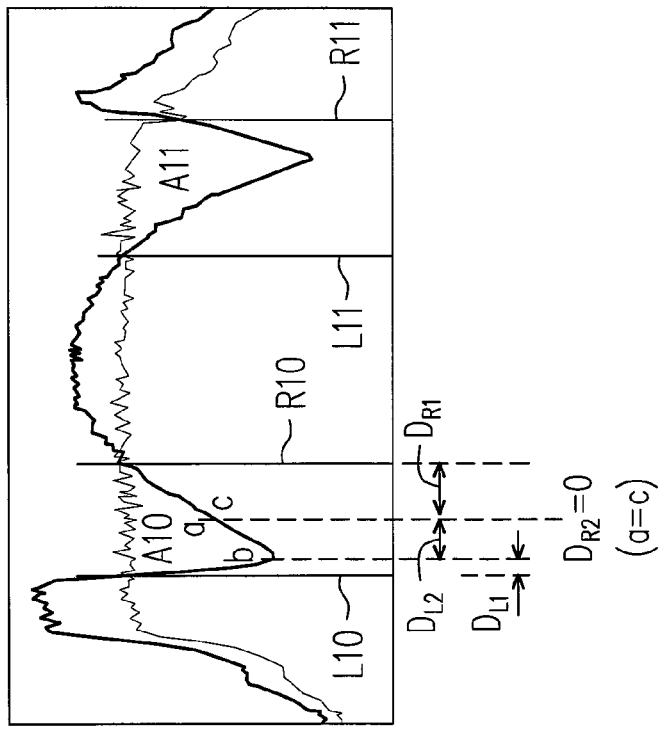
FIGS. 19($a$) and 19($b$) are schematic diagrams of the convex shape determining process according to an embodiment of the invention.
Figure 19A:
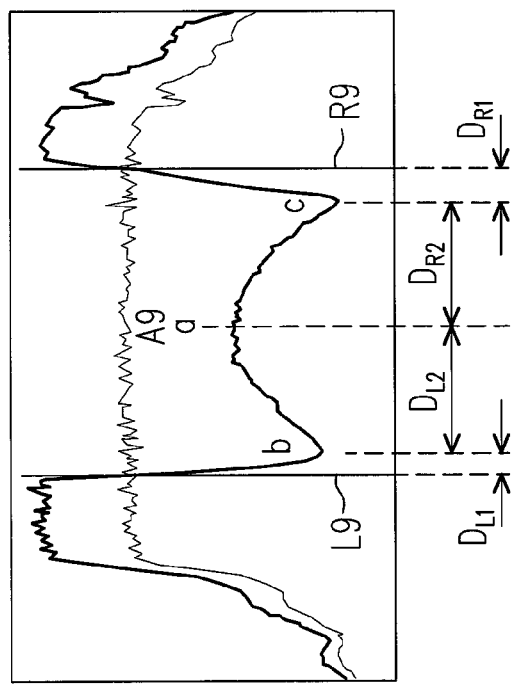

In the present embodiment of the invention, besides that the first area of the covered region, or the area ratio obtained by dividing the first area by the second area, the determination to whether the covered region requires the correction can be further determined by a convex shape determining process in step S1701. The so-called "convex shape determining process" in the present embodiment refers to determining whether the covered region is substantially of a "convex shape". More specifically, if it is determined that the covered region is the convex shape, this indicates that, although the covered region is influenced by the overexposure, a degree of the signal intensity getting stronger due to the light reflection is yet exceed the threshold value distribution graph for dividing the original covered region into two. Otherwise, if it determined that the covered region is a non-convex shape, this indicates that, the covered region being measured is one of the two covered regions being the original covered region divided into two due to the light reflection. FIG. 18 is a flowchart of a convex shape determining process according to an embodiment of the invention. As shown in FIG. 18, in the resent embodiment of the invention, step S1710 of the correcting method according to the present embodiment includes steps S1810 to S1830. When it is determined that the overexposure is occurred in the covered region, although this indicates that the pixel position being previously obtained for calculating the corresponding position of the touch point may have errors or misjudgments, however, physical characteristics of the covered region can still be used in calculation of the corresponding pixel position as long as the influence of the overexposure is contained to a specific degree. FIGS. 19(a) and 19(b) are schematic diagrams of the convex shape determining process according to an embodiment of the invention.

In step S1810, as shown in FIG. 19(a) and FIG. 19(b), the control unit 450 calculates, in each of the at least one covered region, a left first length $D_{L1}$ between the left border (L9 or L10) and a left lowest point b, a left second length $D_{L2}$ between a center a and the lowest point b, a right first length $D_{R1}$ between the right border (R9 or R10) and a right lowest point c, and a right second length $D_{R2}$ between the center and the right lowest point c. Therein, the left lowest point b of the detective signal distribution graph has a lowest signal intensity among signals at left of the center a of the covered region, and the right lowest point c of the detective signal distribution graph has a lowest signal intensity among signals at right of the center a of the covered region.

In step S1820, the control unit 450 determines that the covered region being a convex shape when the left second length $D_{L2}$ being greater than the left first length $D_{L1}$ and the right second length $D_{R2}$ being greater than the right first length $D_{R1}$. As shown in FIG. 19(a), the covered region A9 is substantially the convex shape. Although the overexposure is occurred in the covered region A9, the light reflection of the overexposure is not strong enough for the signal intensity in the covered region A9 to generate two covered regions. Therefore, as interpretation of physical phenomena, the center a can still serve as the pixel position corresponding to the covered region A9, and it is not required for the covered region A9 to be corrected.

In step S1830, the control unit 450 determines that the covered region being a non-convex shape when the left second length $D_{L2}$ being smaller than the left first length $D_{L1}$ and the right second length $D_{R2}$ being smaller than the right first length $D_{R1}$. As shown in FIG. 19(b), in the covered region A10, the center a and the right lowest point c are of the same point and the right second length $D_{R2}$ is 0, thus the right second length $D_{R2}$ is smaller than the right first length $D_{R1}$, so that the control unit 450 can determine that the covered region A10 is the non-convex shape. The covered region A10 and the covered region A11 are two covered regions generated by touching of one single finger under the influence of the overexposure. Therefore, in case the correction is not performed thereto, errors or misjudgments generated in analyzed result for the position of the touch point may occur due to the influence of the overexposure.

After the covered region (the covered region being the non-convex shape) which may cause errors or misjudgments due to insufficient overexposure is determined by the convex shape determining process, next, as shown in FIG. 17, a merging correction process (steps S1721 to S1723) and a border updating correction process (steps S1731 to S1734) can be utilized to correct the covered region.

Figure 20A:
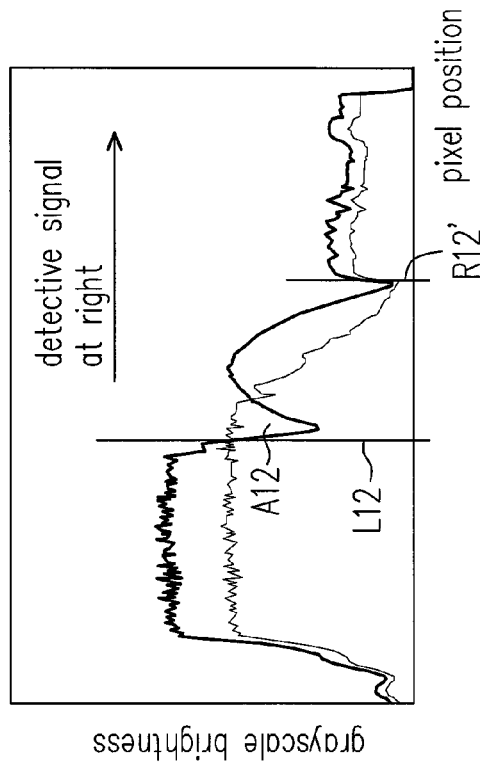
FIGS. 20($a$) and 20($b$) are schematic diagrams of a border updating correction process according to an embodiment of the invention.
Figure 20B:
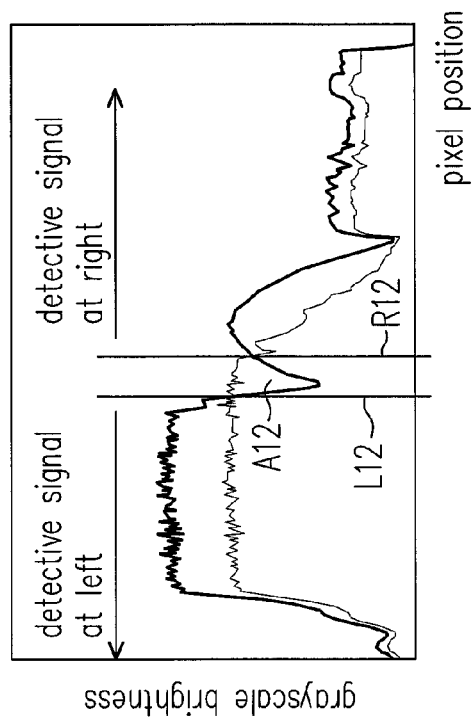
Figure 21A:
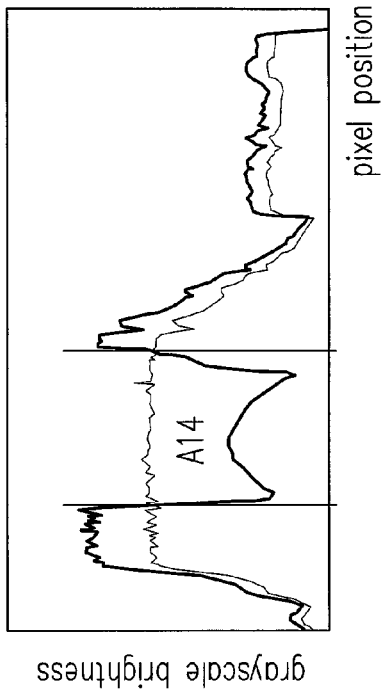
FIG. 21($a$) to FIG. 21($d$), FIG. 22($a$) to FIG. 22($d$), FIG. 23($a$) to FIG. 23($d$), FIG. 24($a$) to FIG. 24($d$), FIG. 25($a$) to FIG. 25($b$), FIG. 26($a$) to FIG. 26($b$)
Figure 21B:
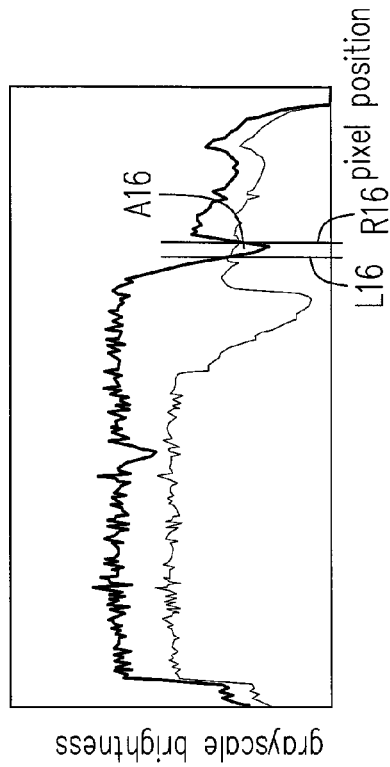
Figure 21C:
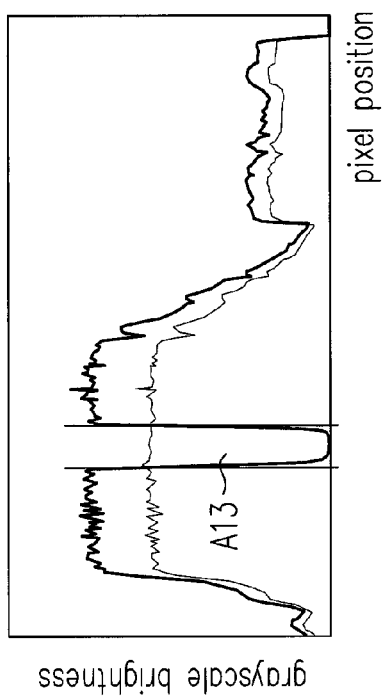
Figure 21D:
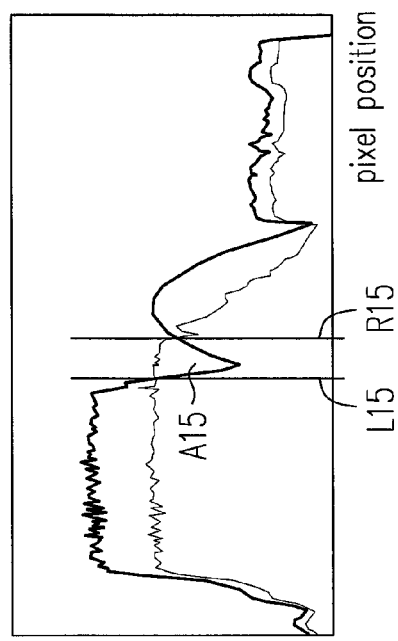

A difference between steps S1721 to S1723 and steps S1210 to S1230 is that, besides that the two adjacent covered regions being overexposed, a target to be corrected herein can further include the covered region without characteristic of the non-convex shape. Other than that, details thereof are identical to the same that of steps S1210 to S1230, thus related description is omitted hereinafter. In step S1721, if two adjacent covered regions both being overexposed and not being the non-convex shape are found, or if all of the two adjacent covered regions of the non-convex shape having the overexposure corrected, proceeding to the border updating correction process (steps S1731 to S1734). FIGS. 20(a) and 20(b) are schematic diagrams of a border updating correction process according to an embodiment of the invention.

In step S1731, the control unit 450 determines whether a covered region having the overexposure and being the non-convex shape is provided. If the control unit 450 determines that the covered region being overexposed and being the non-convex shape is provided, such as a covered region A12 depicted in FIG. 20(a), proceeding to step S1732. If the covered region being overexposed and being the non-convex shape is not provided, or the covered region being overexposed and being the non-convex shape is corrected, proceeding to step S560.

In step S1732, the control unit 450 calculates a left variation of the detective signal distribution graph at left of the left border of the covered region with respect to the threshold value distribution graph, and a right variation of the detective signal distribution graph at right of the right border of the covered region with respect to the threshold value distribution graph. In the present embodiment of the invention, the control unit 450 can obtain the left variation by using the following function (2):

$$\frac{\sum_{i=0}^{L} FGV(i) \times 75\% - BGV(i)}{\sum_{i=0}^{L} BGV(i)} \quad (2)$$

And, the right variation can be obtained by using the following function (3):

$$\frac{\sum_{i=R}^{N} FGV(i) \times 75\% - BGV(i)}{\sum_{i=R}^{N} BGV(i)} \quad (3)$$

In view of above, FGV being the detective signal distribution graph, BGV being the threshold value distribution graph, i being the corresponding pixel position, L being the left border of the covered region, R being the right border of the covered region, 0 being a leftist pixel position in the detective signal distribution graph, and N being a rightest pixel position in the detective signal distribution graph.

In step S1733, if the right variation is greater than the left variation in the covered region being overexposed, the control unit 450 calculates a center between the left border and a border passing through a turning point of the detective signal distribution graph, and the center is served as a pixel position of the covered region having the overexposure corrected. As shown in FIG. 20(a), if the right variation is greater than the left variation, this indicates that the overexposure is occurred in a right border R12 of the covered region A12 which requires the correction. Therefore, the control unit 450 can search a turning point R12' to serve as the right border after being corrected, as shown in FIG. 20(b), and a center between the L12 and R12' can be set as the pixel position of the covered region having the overexposure corrected. The control unit 450 can search the turning point by calculating a slope variation of the detective signal distribution graph or using other mathematical algorithms, and the invention is not limited thereto.

In step S1734, if the left variation is greater than the right variation in the covered region being overexposed, the control unit 450 calculates a center between the right border and a border passing through a turning point of the detective signal distribution graph, the center is served as a pixel position of the covered region having the overexposure corrected. If the left variation is greater than the right variation, this indicates that the overexposure is occurred in a left border of the covered region which requires the correction. Above-said step is similar to step S1733, thus related description is omitted hereinafter.

FIG. 21(a) to FIG. 21(d), FIG. 22(a) to FIG. 22(d), FIG. 23(a) to FIG. 23(d), FIG. 24(a) to FIG. 24(d), FIG. 25(a) to FIG. 25(b), FIG. 26(a) to FIG. 26(b), FIG. 27 and FIG. 28 are schematic diagrams of a method for correcting touch signal according to another embodiment of the invention.

Figure 22A:
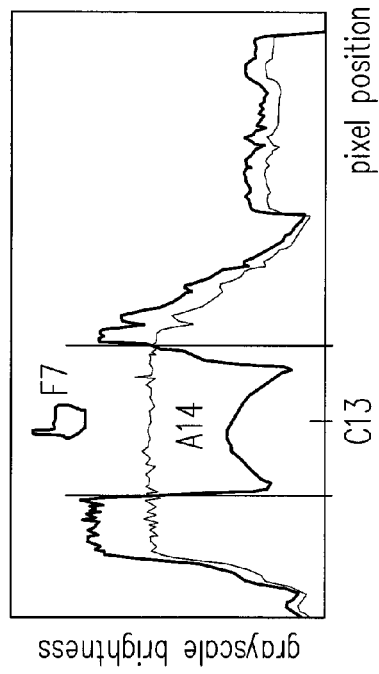
Figure 22B:
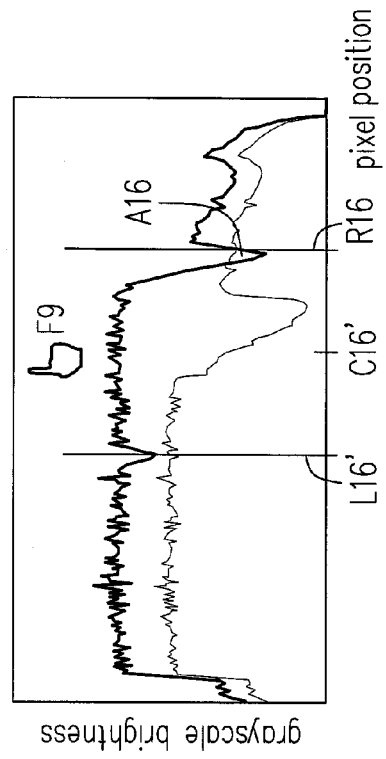
Figure 22C:
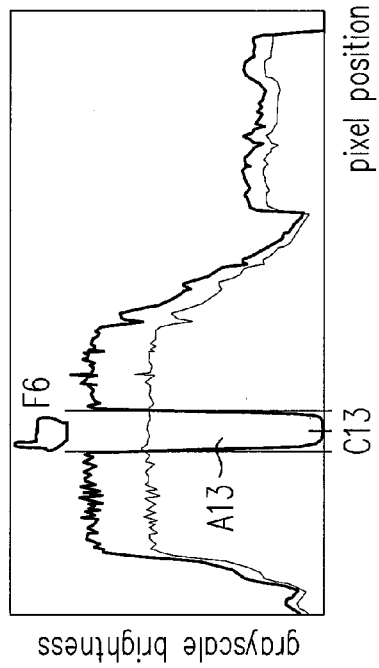
Figure 22D:
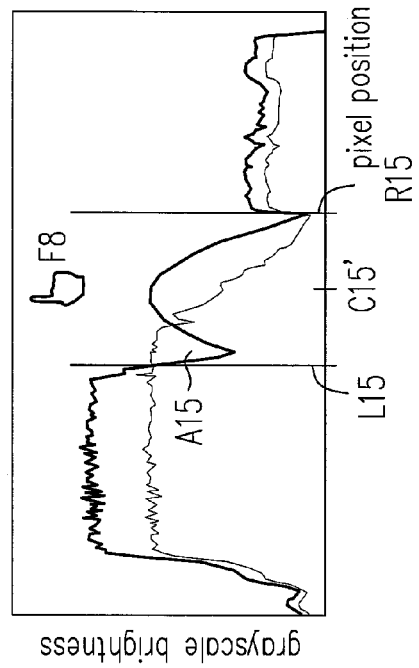
Figure 23A:
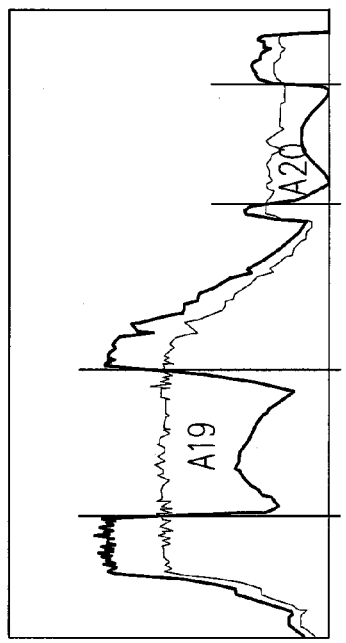
Figure 23B:
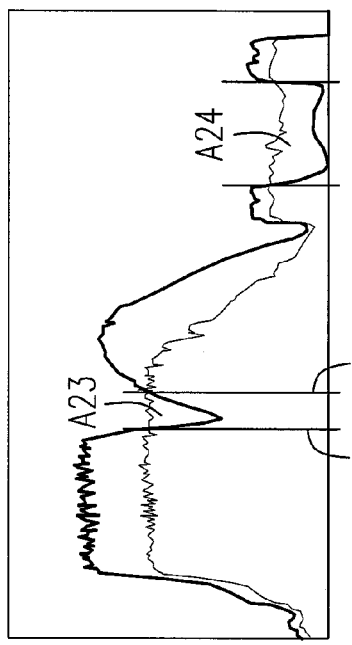
Figure 23C:
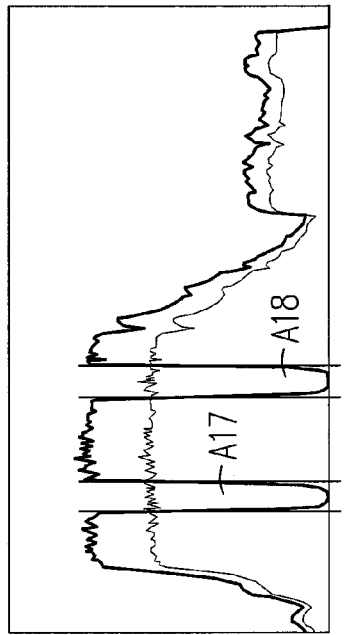
Figure 23D:
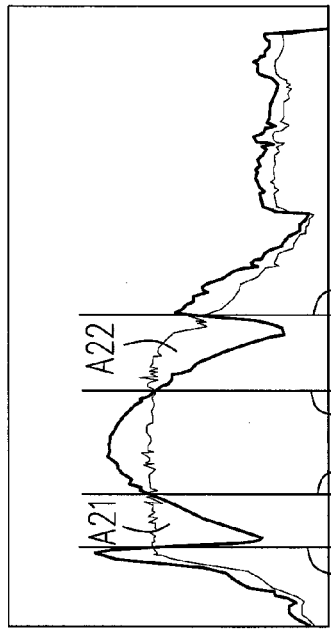

As shown in FIG. 21(a) to FIG. 21(d), when the control unit 450 determines that one single covered region is provided by executing steps S510 to S540, the subsequent processes are as below. It can be determined that a covered region A13 is not overexposed, such that the subsequent processes are not required as the results determined by step S1721 and step S1731 being no, and step S560 can be executed to calculate the touch point of a finger F6 corresponding to a pixel position C13 of the covered region A13, as shown in FIG. 22(a). It can be determined that a covered region A14 is the convex shape in step S1710, such that the subsequent processes are not required as the results determined by step S1721 and step S1731 both being no, and step S560 can be executed to calculate the touch point of a finger F7 corresponding to a pixel position C14 of the covered region A14, as shown in FIG. 22(b). It can be determined that a covered region A15 is overexposed and the non-convex shape, such that the result determined by step S1721 being no, the result determined by step S1732 being yes, and it is also determined that the right variation is greater than the left variation in step S1732. Therefore, a turning point R15' is searched in step S1733 and served as the right border having the overexposure corrected, thus the corrected pixel position is C15' and the touch point corresponding to a finger F8 can be calculated in step S560, as shown in FIG. 22(c). It can be determined that a covered region A16 is overexposed and the non-convex shape, such that the result determined by step S1721 being no, the result determined by step S1731 being yes, and it is also determined that the left variation is greater than the right variation in step S1732. Therefore, a turning point L16' is searched in step S1734 and served as the left border having the overexposure corrected, thus the corrected pixel position is C16' and the touch point corresponding to a finger F9 can be calculated in step S560, as shown in FIG. 22(d).

Figure 24A:
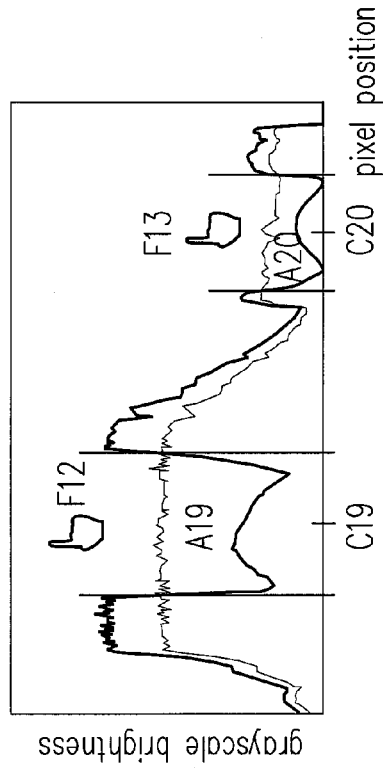
Figure 24B:
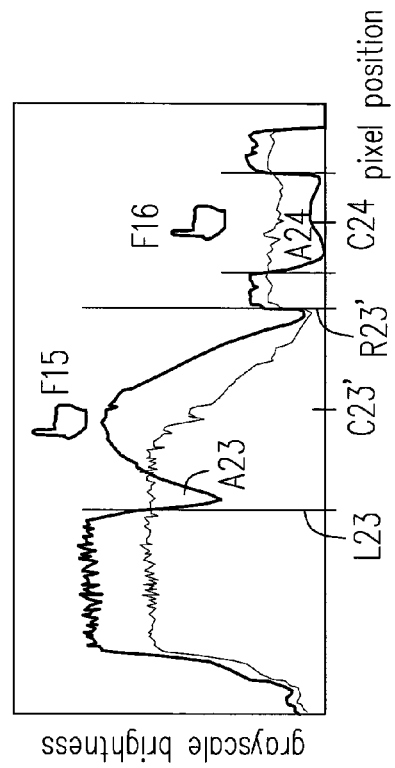
Figure 24C:
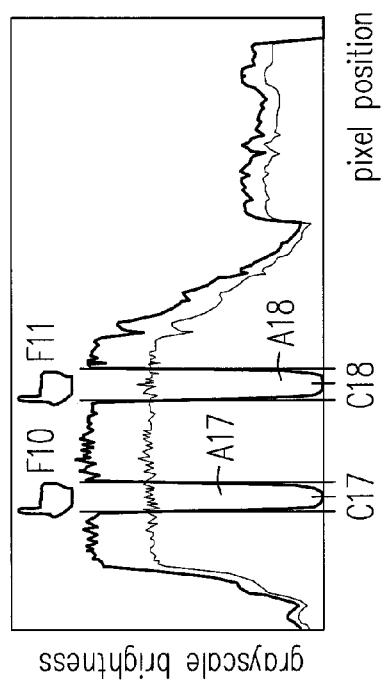
Figure 24D:
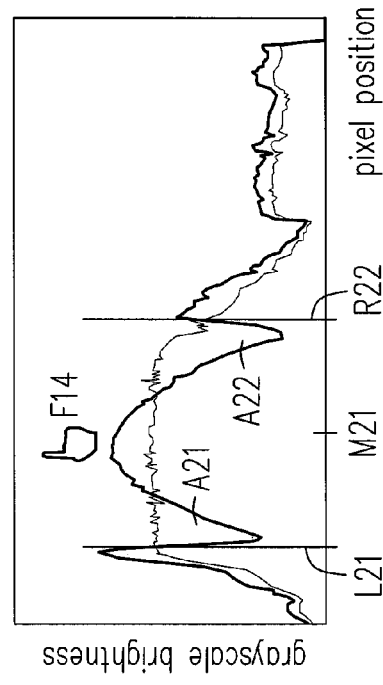

As shown in FIG. 23(a) to FIG. 23(d), when the control unit 450 determines that two covered regions are provided by executing steps S510 to S540, the subsequent processes are as below. It can be determined that covered regions A17 and A18 are not overexposed, such that the subsequent processes are not required as the results determined by step S1721 and step S1731 both being no, and step S560 can be executed to calculate the touch points of fingers F10 and F11 respectively corresponding to pixel positions C17 and C18 of the covered regions A17 and A18, as shown in FIG. 24(a). It can be determined that covered regions A19 and A20 are the convex shape in step S1710, such that the subsequent processes are not required as the results determined by step S1721 and step S1731 both being no, and step S560 can be executed to calculate the touch points of fingers F12 and F13 corresponding to pixel positions C19 and C20 of the covered regions A19 and A20, as shown in FIG. 24(b). It can be determined that covered regions A21 and A22 are two adjacent covered regions both being overexposed and not being the non-convex shape in step S1721, the merging correction process (steps S1722 and S1723) can be executed to find the corrected pixel position M21, so that step S560 can be executed to calculate the touch point corresponding to a finger F14, as shown in FIG. 24(c). It can be determined that a covered region A23 is overexposed and the non-convex shape, such that the result determined by step S1721 being no, the result determined by step S1731 being yes, and it is also determined that the right variation is greater than the left variation in step S1732. Therefore, a turning point R23' is searched in step S1733 and served as the right border having the overexposure corrected, thus the corrected pixel position is C23'. It can be determined that a covered region A24 is the convex shape in step S1710, such that the subsequent processes are not required as the results determined by step S1721 and step S1731 both being no. Lastly, the touch point of a finger F15 corresponding to the pixel position C23' and the touch point of a finger F16 corresponding to a pixel position C24 can be calculated in step S560, as shown in FIG. 24(d).

Figure 25A:
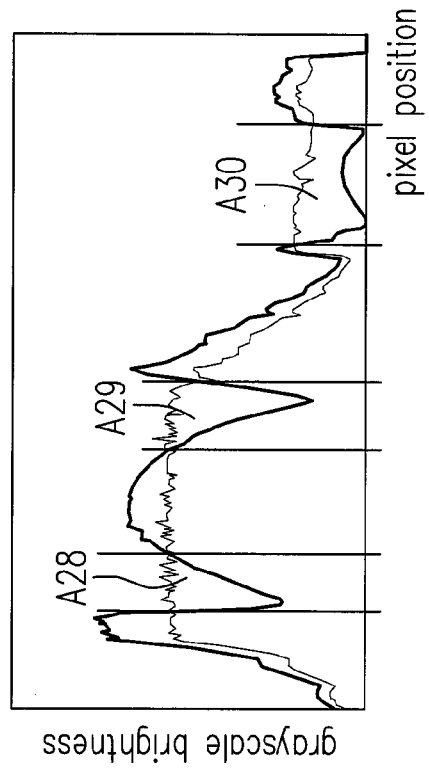
Figure 25B:
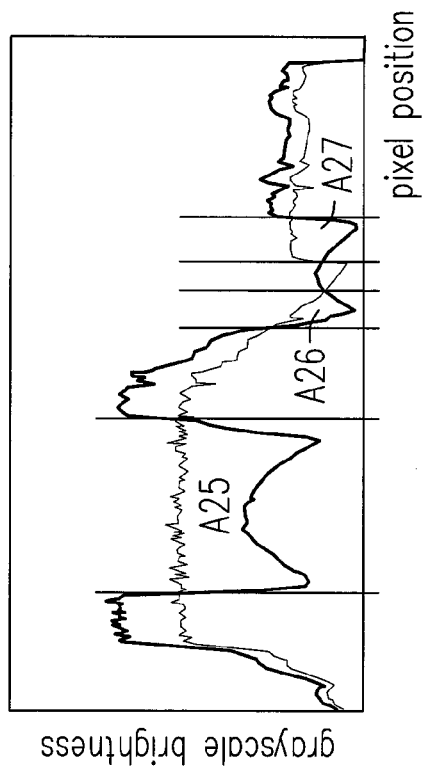
Figure 26B:
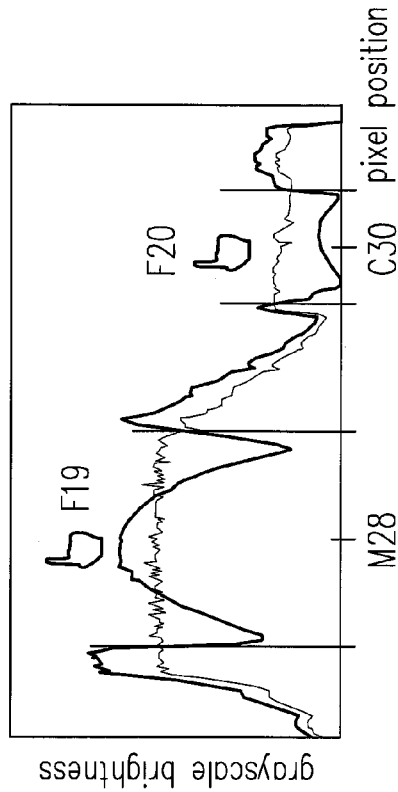
Figure 26A:
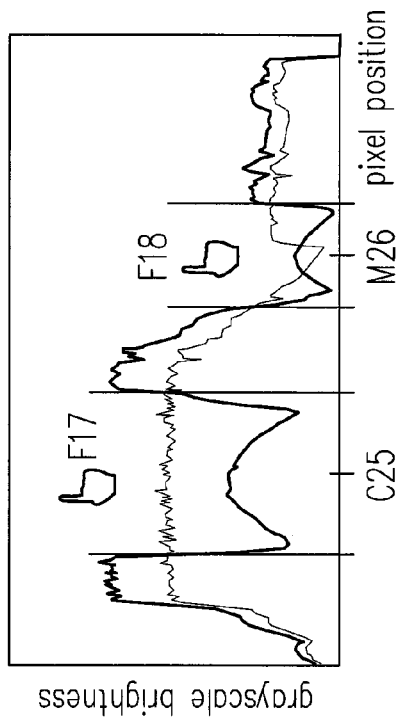

As shown in FIG. 25(a) to FIG. 25(b), when the control unit 450 determines that three covered regions are provided by executing steps S510 to S540, the subsequent processes are as below. It can be determined that a covered region A25 is the convex shape in step S1710, such that the subsequent processes are not required as the results determined by step S1721 and step S1731 both being no, and step S560 can be executed to calculate the touch point of a finger F17 corresponding to a pixel position C25 of the covered region A25. It can be determined that covered regions A26 and A27 are two adjacent covered regions both being overexposed and not being the non-convex shape in step S1721, the merging correction process (steps S1722 and S1723) can be executed to find the corrected pixel position M26, so that step S560 can be executed to calculate the touch point corresponding to a finger F18, as shown in FIG. 26(a). It can be determined that a covered region A30 is the convex shape in step S1710, such that the subsequent processes are not required as the results determined by step S1721 and step S1731 both being no, and step S560 can be executed to calculate the touch point of a finger F20 corresponding to a pixel position C30 of the covered region A25. It can be determined that covered regions A28 and A29 are two adjacent covered regions both being overexposed and not being the non-convex shape in step S1721, the merging correction process (steps S1722 and S1723) can be executed to find the corrected pixel position M28, so that step S560 can be executed to calculate the touch point corresponding to a finger F19, as shown in FIG. 26(b).

Figure 27:
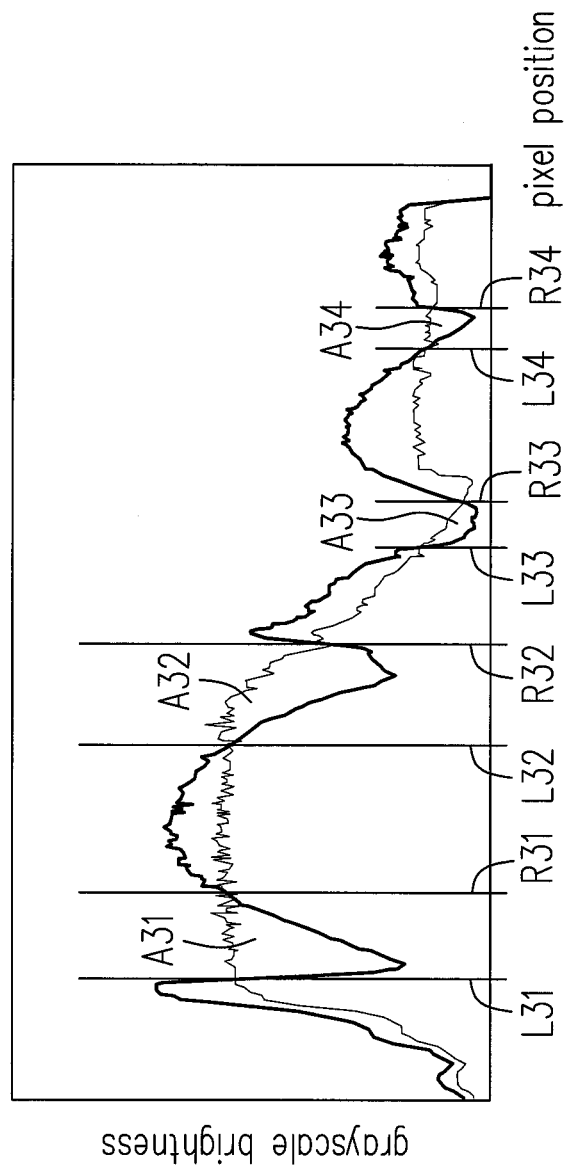
FIG. 27 and FIG. 28 are schematic diagrams of a method for correcting touch signal according to another embodiment of the invention.
Figure 28:
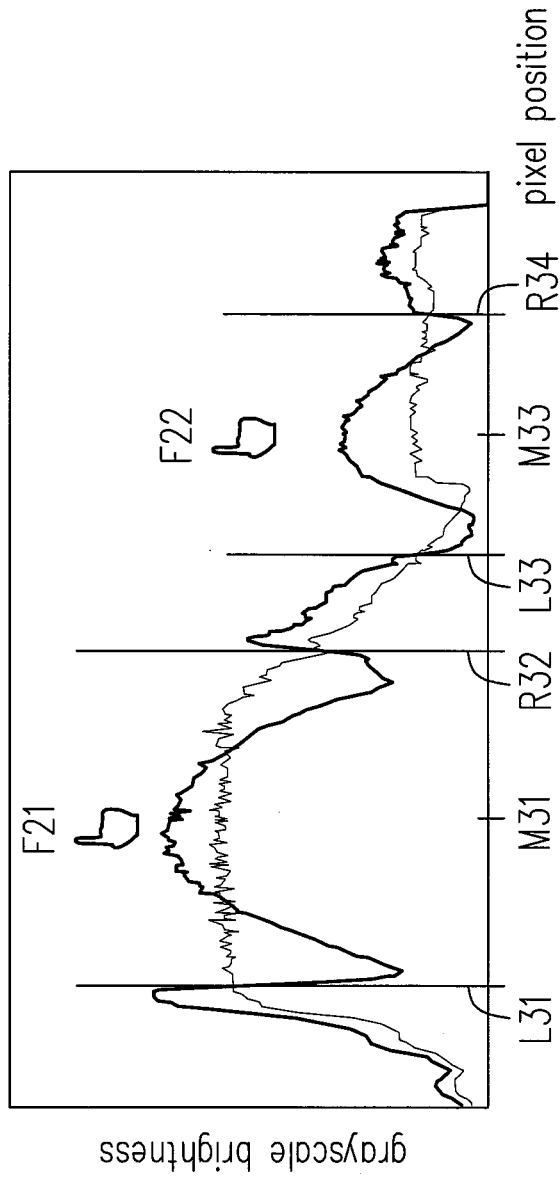

As shown in FIG. 27, when the control unit 450 determines that four covered regions are provided by executing steps S510 to S540, the subsequent processes are as below. It can be determined that covered regions A31 and A32 are two adjacent covered regions both being overexposed and not being the non-convex shape in step S1721, the merging correction process (steps S1722 and S1723) can be executed to find the corrected pixel position M31, so that the step S560 can be executed to calculate the touch point corresponding to a finger F21. It can be determined that covered regions A33 and A34 are two adjacent covered regions both being overexposed and not being the non-convex shape in step S1721, the merging correction process (steps S1722 and S1723) can be executed to find the corrected pixel position M33, so that step S560 can be executed to calculate the touch point corresponding to a finger F22, as shown in FIG. 28. As interpretation of physical phenomena, the covered regions A32 and A33 are definitely formed by different fingers, such that a chance for merging the covered regions A32 and A33 can be excluded in another embodiment of the invention.

In summary, according to the invention, the detective signal distribution graph, the covered region and the corresponding pixel position are obtained by emitting the beam to the blocking object. Whether the overexposure is occurred, and whether the covered region is the convex shape are determined according to the first area corresponding to the detective signal distribution graph in the covered region or the area ratio thereof (the ratio of the first area and the second area). After it is determined that the overexposure is occurred and the covered region is the non-convex shape, the pixel position being previously obtained can be corrected by replacing it with, the pixel position obtained by merging the two adjacent regions that is overexposed and non-convex shape, or the pixel position corresponding to the turning point obtained by executing the border updating correction process based on the determination of the left variation and the right variation, or the pixel position corresponding to the minimum amount of other covered regions obtained by adjusting the specific frequency of the beam being emitted. Accordingly, errors and misjudgments due to the overexposure can be reduced to improve the accuracy in touch control.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An apparatus for correcting touch signal, comprising:
a light emitting unit configured to emit at least one beam;
a reflective element configured to reflect the at least one beam;
a sensing unit configured to obtain a detective beam generated by reflecting the at least one beam by the reflective element, thereby generating a detective signal distribution graph, wherein the detective signal distribution graph indicates a plurality of pixel positions of an optical touching region and a plurality of corresponding signal intensities, and the reflective element is disposed at periphery of the optical touching region; and
a control unit coupled to the light emitting unit and the sensing unit, and configured for:
obtaining a plurality of intersections, at least one covered region and the pixel positions corresponding to each of the at least one covered region according to the detective signal distribution graph and the threshold value distribution graph, wherein each of the covered region corresponds to two adjacent intersections;

calculating a first area occupied by each of the covered region according to the detective signal distribution graph and the plurality of intersections;

determining whether an overexposure is occurred in the at least one covered region according to the first area corresponding to the at least one covered region; and correcting the at least one covered region being overexposed and the pixel position corresponding to the at least one covered region if the overexposure is occurred in the at least one covered region, wherein when the control unit obtaining the pixel position corresponding to each of the at least one covered region, the control unit is further configured for:

obtaining a left border and a right border corresponding to each of the at least one covered region according to the detective signal distribution graph, wherein the left border and the right border pass through the two adjacent intersections corresponding to the at least one covered region, respectively; and setting a center between the left border and the right border as the pixel position corresponding to each of the at least one covered region, wherein when the control unit correcting the pixel position corresponding to the at least one covered region being overexposed, the control unit is further configured for:

determining whether the overexposure is occurred in two adjacent covered regions among the at least one covered region; and calculating, if the overexposure is occurred in the two adjacent covered regions, a center between the left border of the at least one covered region at left and the right border of the at least one covered region at right among the two adjacent covered regions, and the center being served as a pixel position of the at least one covered region having the overexposure corrected.

2. The apparatus of claim 1, wherein when the control unit correcting the pixel position corresponding to the at least one covered region being overexposed, the control unit is further configured for:

determining whether a covered region being exposed is provided;

calculating, if the at least one covered region having the overexposure is provided, a left variation of the detective signal distribution graph at left of the left border of the at least one covered region with respect to the threshold value distribution graph, and a right variation of the detective signal distribution graph at right of the right border of the at least one covered region with respect to the threshold value distribution graph;

calculating, if the right variation is greater than the left variation in the at least one covered region being overexposed, a center between the left border and a border passing through a turning point of the detective signal distribution graph, the center being served as a pixel position of the at least one covered region having the overexposure corrected; and calculating, if the left variation is greater than the right variation in the at least one covered region being overexposed, a center between the right border and the border passing through the turning point of the detective signal distribution graph, the center being served as the pixel position of the at least one covered region having the overexposure corrected.

3. The apparatus of claim 2, wherein when the control unit correcting the pixel position corresponding to the at least one covered region being overexposed, the control unit is further configured for:

calculating, in each of the at least one covered region, a left first length between the left border and a left lowest point, a left second length between the center and the left lowest point, a right first length between the right border and a right lowest point, and a right second length between the center and the right lowest point;

determining that the at least one covered region being a convex shape when the left second length being greater than the left first length and the right second length being greater than the right first length; and determining that the at least one covered region being a non-convex shape when the left second length being smaller than the left first length or the right second length being smaller than the right first length, wherein the left lowest point of the detective signal distribution graph has a lowest signal intensity among signals at left of the center of the at least one covered region, and the right lowest point of the detective signal distribution graph has a lowest signal intensity among signals at right of the center of the at least one covered region.

4. The apparatus of claim 3, wherein when the control unit correcting the pixel position corresponding to the at least one covered region being overexposed, the control unit is further configured for:

correcting the at least one covered region if the at least one covered region is determined to be the non-convex shape.

5. The apparatus claim 1, wherein the at least one light beam has a specific frequency, and when the control unit correcting the pixel position corresponding to the at least one covered region being overexposed, the control unit is further configured for:

adjusting and emitting the at least one light beam with the specific frequency, so as to obtain an other detective signal distribution graph corresponding to the specific frequency;

obtaining at least one other covered region according to the other detective signal distribution graph and the threshold value distribution graph;

determining whether an amount of the at least one other covered region is a minimum value; and setting, if the amount of the at least one other covered region is the minimum value, the at least one other covered region as the at least one covered region having the overexposure corrected, and setting a center between a left border and a right border corresponding to the at least one other covered region as a pixel position of the at least one covered region having the overexposure corrected.

6. The apparatus of claim 1, wherein the threshold value distribution graph is generated according to a specific proportion of an original signal distribution graph, and the original signal distribution graph is generated without blocking objects provided in the optical touching region, by the sensing unit obtaining an original light beam generated by reflecting the at least one light beam by the reflective element.

7. The apparatus of claim 1, wherein the first area is formed by surrounding the left border and the right border respectively corresponding to the detective signal distribution graph and the at least one covered region.

8. A system for correcting touch signal, comprising:
an optical touch screen of shielded type;
a light emitting unit configured to emit at least one beam;

a reflective element disposed at periphery of the optical touch screen, and configured to reflect the at least one beam;

a sensing unit configured to obtain a detective beam generated by reflecting the at least one beam by the reflective element, thereby generating a detective signal distribution graph, wherein the detective signal distribution graph indicates a plurality of pixel positions of the optical touch screen and a plurality of corresponding signal intensities; and a control unit coupled to the optical touch screen, the light emitting unit and the sensing unit, and configured for:

obtaining a plurality of intersections, at least one covered region and the pixel positions corresponding to each of the at least one covered region according to the detective signal distribution graph and the threshold value distribution graph, wherein each of the covered region corresponds to two adjacent intersections;

calculating a first area occupied by each of the covered region according to the detective signal distribution graph and the plurality of intersections;

determining whether an overexposure is occurred in the at least one covered region according to the first area corresponding to the at least one covered region; and correcting the at least one covered region being overexposed and the pixel position corresponding to the at least one covered region if the overexposure is occurred in the at least one covered region, wherein when the control unit obtaining the pixel position corresponding to each of the at least one covered region, the control unit is further configured for:

obtaining a left border and a right border corresponding to each of the at least one covered region according to the detective signal distribution graph, wherein the left border and the right border pass through the two adjacent intersections corresponding to the at least one covered region, respectively; and setting a center between the left border and the right border as the pixel position corresponding to each of the at least one covered region, wherein when the control unit correcting the pixel position corresponding to the at least one covered region being overexposed, the control unit is further configured for:

determining whether the overexposure is occurred in two adjacent covered regions among the at least one covered region; and calculating, if the overexposure is occurred in the two adjacent covered regions, a center between the left border of the at least one covered region at left and the right border of the at least one covered region at right among the two adjacent covered regions, and the center being served as a pixel position of the at least one covered region having the overexposure corrected.

9. The system of claim 8, wherein when the control unit correcting the pixel position corresponding to the at least one covered region being overexposed, the control unit is further configured for:

determining whether a covered region being exposed is provided;

calculating, if the at least one covered region having the overexposure is provided, a left variation of the detective signal distribution graph at left of the left border of the at least one covered region with respect to the threshold value distribution graph, and a right variation of the detective signal distribution graph at right of the right border of the at least one covered region with respect to the threshold value distribution graph;

calculating, if the right variation is greater than the left variation in the at least one covered region being overexposed, a center between the left border and a border passing through a turning point of the detective signal distribution graph, the center being served as a pixel position of the at least one covered region having the overexposure corrected; and calculating, if the left variation is greater than the right variation in the at least one covered region being overexposed, a center between the right border and the border passing through the turning point of the detective signal distribution graph, the center being served as the pixel position of the at least one covered region having the overexposure corrected.

10. The system of claim 9, wherein when the control unit correcting the pixel position corresponding to the at least one covered region being overexposed, the control unit is further configured for:

calculating, in each of the at least one covered region, a left first length between the left border and a left lowest point, a left second length between the center and the left lowest point, a right first length between the right border and a right lowest point, and a right second length between the center and the right lowest point;

determining that the at least one covered region being a convex shape when the left second length being greater than the left first length and the right second length being greater than the right first length; and determining that the at least one covered region being a non-convex shape when the left second length being smaller than the left first length or the right second length being smaller than the right first length, wherein the left lowest point of the detective signal distribution graph has a lowest signal intensity among signals at left of the center of the at least one covered region, and the right lowest point of the detective signal distribution graph has a lowest signal intensity among signals at right of the center of the at least one covered region.

11. The system of claim 10, wherein when the control unit correcting the pixel position corresponding to the at least one covered region being overexposed, the control unit is further configured for:

correcting the at least one covered region if the at least one covered region is determined to be the non-convex shape.

12. The system claim 8, wherein the at least one light beam has a specific frequency, and when the control unit correcting the pixel position corresponding to the at least one covered region being overexposed, the control unit is further configured for:

adjusting and emitting the at least one light beam with the specific frequency, so as to obtain an other detective signal distribution graph corresponding to the specific frequency;

obtaining at least one other covered region according to the other detective signal distribution graph and the threshold value distribution graph;

determining whether an amount of the at least one other covered region is a minimum value; and setting, if the amount of the at least one other covered region is the minimum value, the at least one other covered region as the at least one covered region having the overexposure corrected, and setting a center between a left border and a right border corresponding to the at least one other covered region as a pixel position of the at least one covered region having the overexposure corrected.

13. The system of claim 8, wherein the threshold value distribution graph is generated according to a specific proportion of an original signal distribution graph, and the original signal distribution graph is generated without blocking objects provided in the optical touching region, by the sensing unit obtaining an original light beam generated by reflecting the at least one light beam by the reflective element.

14. The system of claim 8, wherein the first area is formed by surrounding the left border and the right border respectively corresponding to the detective signal distribution graph and the at least one covered region.

15. A method for correcting touch signal, comprising:
   emitting at least one beam to obtain a detective beam generated by reflecting the at least one beam by at least one reflective element, thereby generating a detective signal distribution graph, wherein the detective signal distribution graph indicates a plurality of pixel positions of an optical touching region and a plurality of corresponding signal intensities;
   obtaining a plurality of intersections, at least one covered region and the pixel positions corresponding to each of the at least one covered region according to the detective signal distribution graph and the threshold value distribution graph, wherein each of the covered region corresponds to two adjacent intersections;
   calculating a first area occupied by each of the covered region according to the detective signal distribution graph and the plurality of intersections;
   determining whether an overexposure is occurred in the at least one covered region according to the first area corresponding to the at least one covered region; and
   correcting the at least one covered region being overexposed and the pixel position corresponding to the at least one covered region if the overexposure is occurred in the at least one covered region,
   wherein obtaining the pixel positions corresponding to the at least one covered region, comprising:
   obtaining a left border and a right border corresponding to each of the at least one covered region according to the detective signal distribution graph, wherein the left border and the right border pass through the two adjacent intersections corresponding to the at least one covered region, respectively; and
   setting a center between the left border and the right border as the pixel position corresponding to each of the at least one covered region, wherein correcting the pixel position corresponding to the at least one covered region being overexposed, comprising:
   determining whether the overexposure is occurred in two adjacent covered regions among the at least one covered region; and
   calculating, if the overexposure is occurred in the two adjacent covered regions, a center between the left border of the at least one covered region at left and the right border of the at least one covered region at right among the two adjacent covered regions, and the center being served as a pixel position of the at least one covered region having the overexposure corrected.

16. The method of claim 15, wherein correcting the pixel position corresponding to the at least one covered region being overexposed, comprising:
   determining whether a covered region being exposed is provided;
   calculating, if the at least one covered region having the overexposure is provided, a left variation of the detective signal distribution graph at left of the left border of the at least one covered region with respect to the threshold value distribution graph, and a right variation of the detective signal distribution graph at right of the right border of the at least one covered region with respect to the threshold value distribution graph;
   calculating, if the right variation is greater than the left variation in the at least one covered region being overexposed, a center between the left border and a border passing through a turning point of the detective signal distribution graph, the center being served as a pixel position of the at least one covered region having the overexposure corrected; and
   calculating, if the left variation is greater than the right variation in the at least one covered region being overexposed, a center between the right border and the border passing through the turning point of the detective signal distribution graph, the center being served as the pixel position of the at least one covered region having the overexposure corrected.

17. The method of claim 16, wherein correcting the pixel position corresponding to the at least one covered region being overexposed, comprising:
   calculating, in each of the at least one covered region, a left first length between the left border and a left lowest point, a left second length between the center and the left lowest point, a right first length between the right border and a right lowest point, and a right second length between the center and the right lowest point;
   determining that the at least one covered region being a convex shape when the left second length being greater than the left first length and the right second length being greater than the right first length; and
   determining that the at least one covered region being a non-convex shape when the left second length being smaller than the left first length or the right second length being smaller than the right first length,
   wherein the left lowest point of the detective signal distribution graph has a lowest signal intensity among signals at left of the center of the at least one covered region, and the right lowest point of the detective signal distribution graph has a lowest signal intensity among signals at right of the center of the at least one covered region.

18. The method of claim 17, wherein correcting the pixel position corresponding to the at least one covered region being overexposed, comprising:
   correcting the at least one covered region if the at least one covered region is determined to be the non-convex shape.

19. The method claim 15, wherein the at least one beam has a specific frequency, and
   correcting the at least one covered region being overexposed and the pixel position corresponding to the at least one covered region being overexposed comprises:
   adjusting and emitting the at least one light beam with the specific frequency, so as to obtain an other detective signal distribution graph corresponding to the specific frequency;
   obtaining at least one other covered region according to the other detective signal distribution graph and the threshold value distribution graph;
   determining whether an amount of the at least one other covered region is a minimum value; and
   setting, if the amount of the at least one other covered region is the minimum value, the at least one other covered region as the at least one covered region having the overexposure corrected, and setting a center between a left border and a right border corresponding to the at least one other covered region as a pixel position of the at least one covered region having the overexposure corrected.

20. The method of claim 15, wherein the threshold value distribution graph is generated according to a specific proportion of an original signal distribution graph, and the original signal distribution graph is generated without blocking objects provided in the optical touching region, by obtaining an original beam generated by reflecting the at least one beam by the at least one reflective element.

21. The method of claim 15, wherein the first area is formed by surrounding the left border and the right border respectively corresponding to the detective signal distribution graph and the at least one covered region.

22. An apparatus for correcting touch signal, comprising:
a light emitting unit configured to emit at least one beam;
a reflective element configured to reflect the at least one beam;
a sensing unit configured to obtain a detective beam generated by reflecting the at least one beam by the reflective element, thereby generating a detective signal distribution graph, wherein the detective signal distribution graph indicates a plurality of pixel positions of an optical touching region and a plurality of corresponding signal intensities, and the reflective element is disposed at periphery of the optical touching region; and
a control unit coupled to the light emitting unit and the sensing unit, and configured for:
obtaining a plurality of intersections, at least one covered region and the pixel positions corresponding to each of the at least one covered region according to the detective signal distribution graph and the threshold value distribution graph, wherein each of the covered region corresponds to two adjacent intersections;
calculating a first area occupied by each of the covered region according to the detective signal distribution graph and the plurality of intersections;
determining whether an overexposure is occurred in the at least one covered region according to the first area corresponding to the at least one covered region; and
correcting the at least one covered region being overexposed and the pixel position corresponding to the at least one covered region if the overexposure is occurred in the at least one covered region,
wherein when the control unit obtaining the pixel position corresponding to each of the at least one covered region, the control unit is further configured for:
obtaining a left border and a right border corresponding to each of the at least one covered region according to the detective signal distribution graph, wherein the left border and the right border pass through the two adjacent intersections corresponding to the at least one covered region, respectively; and
setting a center between the left border and the right border as the pixel position corresponding to each of the at least one covered region,
wherein when the control unit determining whether the overexposure is occurred in the at least one covered region, the control unit is further configured for:
calculating a second area according to the threshold value distribution graph and the plurality of intersections, wherein the second area is formed by surrounding the left border and the right border corresponding to the threshold value distribution graph and the at least one covered region;
dividing the first area corresponding to each of the at least one covered region by the second area control responding to each of the at least one covered region, so as to obtain at least one area ratio; and
determining, if one of the at least one area ratio is greater than a corresponding ratio threshold value, that the overexposure is occurred in the at least one covered region corresponding to the at least one area ratio.

23. A system for correcting touch signal, comprising:
an optical touch screen of shielded type;
a light emitting unit configured to emit at least one beam;
a reflective element disposed at periphery of the optical touch screen, and configured to reflect the at least one beam;
a sensing unit configured to obtain a detective beam generated by reflecting the at least one beam by the reflective element, thereby generating a detective signal distribution graph, wherein the detective signal distribution graph indicates a plurality of pixel positions of the optical touch screen and a plurality of corresponding signal intensities; and
a control unit coupled to the optical touch screen, the light emitting unit and the sensing unit, and configured for:
obtaining a plurality of intersections, at least one covered region and the pixel positions corresponding to each of the at least one covered region according to the detective signal distribution graph and the threshold value distribution graph, wherein each of the covered region corresponds to two adjacent intersections;
calculating a first area occupied by each of the covered region according to the detective signal distribution graph and the plurality of intersections;
determining whether an overexposure is occurred in the at least one covered region according to the first area corresponding to the at least one covered region; and
correcting the at least one covered region being overexposed and the pixel position corresponding to the at least one covered region if the overexposure is occurred in the at least one covered region,
wherein when the control unit obtaining the pixel position corresponding to each of the at least one covered region, the control unit is further configured for:
obtaining a left border and a right border corresponding to each of the at least one covered region according to the detective signal distribution graph, wherein the left border and the right border pass through the two adjacent intersections corresponding to the at least one covered region, respectively; and
setting a center between the left border and the right border as the pixel position corresponding to each of the at least one covered region,
wherein when the control unit determining whether the overexposure is occurred in the at least one covered region, the control unit is further configured for:
calculating a second area according to the threshold value distribution graph and the plurality of intersections, wherein the second area is formed by surrounding the left border and the right border corresponding to the threshold value distribution graph and the at least one covered region;
dividing the first area corresponding to each of the at least one covered region by the second area corresponding to each of the at least one covered region, so as to obtain at least one area ratio; and
determining, if one of the at least one area ratio is greater than a corresponding ratio threshold value, that the overexposure is occurred in the at least one covered region corresponding to the at least one area ratio.

24. A method for correcting touch signal, comprising:
emitting at least one beam to obtain a detective beam generated by reflecting the at least one beam by at least one reflective element, thereby generating a detective signal distribution graph, wherein the detective signal distribution graph indicates a plurality of pixel positions of an optical touching region and a plurality of corresponding signal intensities;
obtaining a plurality of intersections, at least one covered region and the pixel positions corresponding to each of the at least one covered region according to the detective signal distribution graph and the threshold value distribution graph, wherein each of the covered region corresponds to two adjacent intersections;
calculating a first area occupied by each of the covered region according to the detective signal distribution graph and the plurality of intersections;
determining whether an overexposure is occurred in the at least one covered region according to the first area corresponding to the at least one covered region; and
correcting the at least one covered region being overexposed and the pixel position corresponding to the at least one covered region if the overexposure is occurred in the at least one covered region,
wherein obtaining the pixel positions corresponding to the at least one covered region, comprising:
obtaining a left border and a right border corresponding to each of the at least one covered region according to the detective signal distribution graph, wherein the left border and the right border pass through the two adjacent intersections corresponding to the at least one covered region, respectively; and
setting a center between the left border and the right border as the pixel position corresponding to each of the at least one covered region,
wherein determining whether the overexposure is occurred in the at least one covered region, comprising:
calculating a second area according to the threshold value distribution graph and the plurality of intersections, wherein the second area is formed by surrounding the left border and the right border corresponding to the threshold value distribution graph and the at least one covered region;
dividing the first area corresponding to each of the at least one covered region by the second area corresponding to each of the at least one covered region, so as to obtain at least one area ratio; and
determining, if one of the at least one area ratio is greater than a corresponding ratio threshold value, that the overexposure is occurred in the at least one covered region corresponding to the at least one area ratio.

* * * * *